(12) United States Patent
Lehmann et al.

(10) Patent No.: US 6,428,582 B1
(45) Date of Patent: *Aug. 6, 2002

(54) DYE MIXTURES, 1:2 COBALT COMPLEX FORMAZAN DYES AND THEIR USE

(75) Inventors: Urs Lehmann, Basel; Marcel Frick, Reinach, both of (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/592,898

(22) Filed: Jan. 29, 1996

Related U.S. Application Data

(63) Continuation of application No. 08/242,515, filed on May 13, 1994, now abandoned.

(30) Foreign Application Priority Data

| May 18, 1993 | (CH) | 1514/93 |
| Aug. 24, 1993 | (CH) | 2515/93 |
| Aug. 24, 1993 | (CH) | 2516/93 |

(51) Int. Cl.$^7$ .................. C09B 50/00; C09B 67/22; D06P 3/24
(52) U.S. Cl. .................. 8/641; 8/638; 8/643; 8/685
(58) Field of Search .................. 8/638–643, 675, 8/680–686, 692, 673, 674

(56) References Cited

U.S. PATENT DOCUMENTS

| 3,041,328 A | * | 6/1962 | Kraus | 260/176 |
| 3,491,125 A |   | 1/1970 | Rudolf | 260/372 |
| 4,515,598 A | * | 5/1985 | Meininger et al. | 8/549 |
| 4,553,976 A |   | 11/1985 | Raisin | 8/639 |
| 4,556,401 A |   | 12/1985 | Weitz | 8/641 |
| 4,563,192 A | * | 1/1986 | Salathe et al. | 8/554 |
| 4,693,727 A | * | 9/1987 | Bowles et al. | 8/549 |
| 4,888,028 A | * | 12/1989 | Hitara et al. | 8/549 |
| 4,944,768 A | * | 7/1990 | Balliello et al. | 8/524 |

FOREIGN PATENT DOCUMENTS

| DE | 3329193 | 2/1985 |
| EP | 0124679 | 11/1984 |
| EP | 0300195 | 1/1989 |
| FR | 1370433 | 10/1963 |
| GB | A716753 | 10/1954 |
| GB | A719274 | 12/1954 |
| GB | A745641 | 2/1956 |
| GB | A851861 | 10/1960 |
| GB | A903590 | 8/1962 |
| GB | A945806 | 1/1964 |
| GB | 1019464 | 2/1966 |
| GB | 1028918 | 5/1966 |
| GB | 1046649 | 10/1966 |
| GB | 2009214 | 6/1979 |

OTHER PUBLICATIONS

Venkataraman, vol. 7, pp. 92 and 93 *The Chemistry of Synthetic Dyes*, 1974.
Chem. Abst., vol. 72 (Mar. 1970) abstract 56691e, of SU–A–249515, Sep. 5, 1969.
Chemical Abstracts, 112 (1990) 160998r.
Chemical Abstracts, 72 (1970) 56691e.
C. L. Bird, The Theory and Practice of Wool Dyeing Yorkshire 1972, pp. 78 and 79, lines 26 to 29, 39, 40, 44 and 45.

* cited by examiner

*Primary Examiner*—Margaret Einsmann
(74) *Attorney, Agent, or Firm*—Kevin T. Mansfield

(57) ABSTRACT

Dye mixtures which comprise at least one 1:2 cobalt complex dye of the formazan compound of the formula

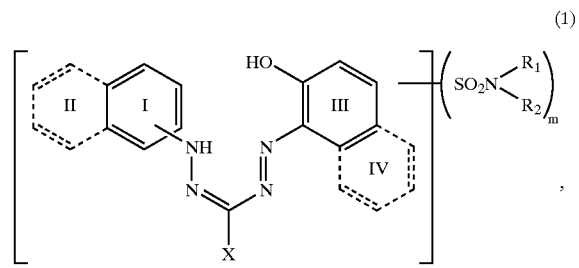

(1)

in which

X is substituted or unsubstituted $C_1$–$C_8$alkyl, phenyl, naphthyl, furyl or thienyl, $R_1$ and $R_2$ independently of one another are hydrogen or substituted or unsubstituted $C_1$–$C_8$alkyl, phenyl or naphthyl, m is a number from 1 to 4 and the rings I, II, III and IV may be further substituted, together with at least one anthraquinone dye of the formula (2) as defined in claim 1, or together with at least one 1:2 chromium or 1:2 cobalt complex dye of two identical or different azo compounds from the group comprising the compounds of the formulae (3), (4), (5) and (6) as defined in claim 1;

and novel 1:2 cobalt complex formazan dyes.

The dye mixtures are particularly suitable for dyeing or printing natural and synthetic polyamide fiber materials, dyeings or prints having good fastnesses being obtained.

4 Claims, No Drawings

DYE MIXTURES, 1:2 COBALT COMPLEX FORMAZAN DYES AND THEIR USE

This application is a continuation of application Ser. No. 08/242,515, filed May 13, 1994, abandoned.

The present invention relates to mixtures of 1:2 cobalt complex formazan dyes with anthraquinone dyes or 1:2 chromium or 1:2 cobalt complex azo dyes, which are particularly suitable for dyeing or printing natural or synthetic textile polyamide fibre materials and in particular have very good fastness properties. The present invention furthermore relates to the novel 1:2 cobalt complex formazan dyes.

The present invention relates to dye mixtures which comprise at least one 1:2 cobalt complex dye of the formazan compound of the formula

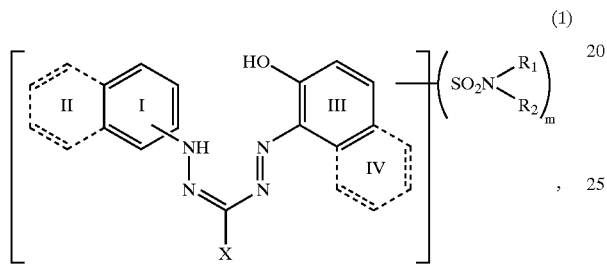

(1)

in which

X is substituted or unsubstituted $C_1$–$C_8$alkyl, phenyl, naphthyl, furyl or thienyl, $R_1$ and $R_2$ independently of one another are hydrogen or substituted or unsubstituted $C_1$–$C_8$alkyl, phenyl or naphthyl, m is a number from 1 to 4 and the rings I, II, III and IV may be further substituted, together with at least one anthraquinone dye of the formula (2)

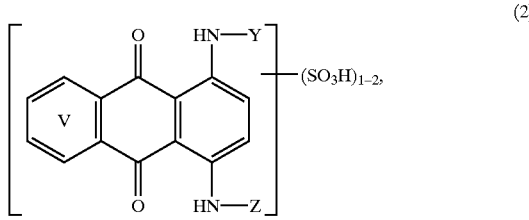

(2)

in which

Y is hydrogen or substituted or unsubstituted $C_1$–$C_8$alkyl, cyclohexyl, phenyl or 1,2,3,4-tetrahydronaphthyl and Z is substituted or unsubstituted $C_1$–$C_8$alkyl, cyclohexyl, phenyl or 1,2,3,4-tetrahydronaphthyl, and in which the ring V of the anthraquinone dye of the formula (2) may be further substituted by one or two hydroxyl groups, or together with at least one 1:2 chromium or 1:2 cobalt complex dye of two identical or different azo compounds from the group comprising compounds of the formulae (3), (4), (5) and (6)

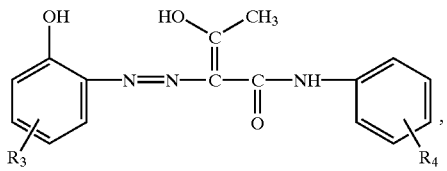

(3)

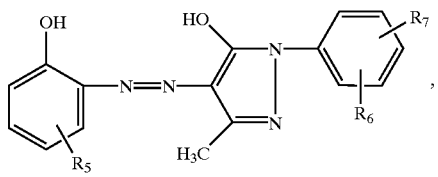

(4)

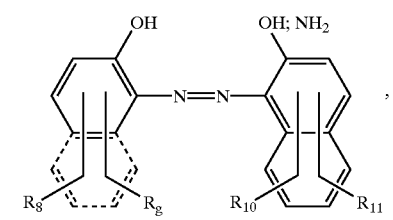

(5)

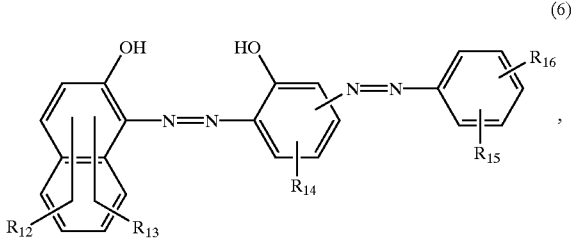

(6)

in which $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ independently of one another are hydrogen, $C_1$–$C_4$alkyl, $C_1$–$C_4$alkoxy, $C_2$–$C_4$alkanoylamino, halogen, sulfo, hydroxyl, nitro, sulfamoyl or N—$C_1$–$C_4$alkylsulfamoyl, which is unsubstituted or further substituted in the alkyl moiety part by hydroxyl or $C_1$–$C_4$alkoxy.

The 1:2 cobalt complex formazan dyes of the formula (1) are preferably symmetric cobalt complex dyes.

Substituents of a phenyl, naphthyl, furyl or thienyl radical X and of rings I, II, III and IV of the formazan compound of the formula (1) are, in addition to the radical of the formula —$SO_2N(R_1)R_2$, independently of one another, for example, $C_1$–$C_4$alkyl, for example methyl or ethyl; $C_1$–$C_4$alkoxy, for example methoxy or ethoxy; unsubstituted or halogen-substituted $C_2$–$C_4$alkanoylamino, for example acetylamino, propionylamino or α,β-dibromopropionylamino; hydroxyl; sulfo; nitro; carboxyl; cyano; amino; halogen, for example fluorine, chlorine or bromine; $C_1$–$C_4$alkylsulfonyl which is unsubstituted or substituted in the alkyl moiety by hydroxyl or $C_1$–$C_4$alkoxy; vinylsulfonyl; α-halogenoacryloylamino; radicals of the formulae —OR, —NHCOR', —COOR", CONHR'" and $SO_2R''''$, in which R, R', R", R'" and R"" independently of one another are phenyl or naphthyl and R' can additionally be $C_1$–$C_4$alkyl; or triazinylamino, which can be further substituted by halogen, $C_1$–$C_4$alkylamino, phenylamino or N—$C_1$–$C_4$alkyl-N-phenylamino. The phenyl or naphthyl radicals mentioned can be substituted as defined above for X and the rings I, II, III and IV, in particular by $C_1$–$C_4$alkyl, $C_1$–$C_4$alkoxy, $C_2$–$C_4$alkanoylamino, hydroxyl, sulfo, nitro, carboxyl, cyano, halogen or $C_1$–$C_4$alkylsulfonyl which is unsubstituted or further substituted in the alkyl moiety by hydroxyl or $C_1$–$C_4$alkoxy.

In addition to the radical of the formula —$SO_2N(R_1)R_2$, preferred substituents for X and the rings I, II, III and IV of the formazan compound of the formula (1) are $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl and nitro.

X is preferably phenyl, which can be substituted, for example, as defined above.

Phenyl or naphthyl radicals $R_1$ and $R_2$ can be unsubstituted or substituted. Examples of such substituents are $C_1$–$C_4$alkyl, $C_1$–$C_4$alkoxy, $C_2$–$C_4$alkanoylamino, $C_1$–$C_4$alkylsulfonyl, halogen, sulfo, hydroxyl, carboxyl, nitro, sulfamoyl and N—$C_1$–$C_4$alkylsulfamoyl which is unsubstituted or further substituted in the alkyl moiety by hydroxyl or $C_1$–$C_4$alkoxy.

$C_1$–$C_8$alkyl radicals X, $R_1$ and $R_2$ independently of one another are, for example, methyl, ethyl, propyl, isopropyl, butyl, isobutyl, sec-butyl, tert-butyl, pentyl, hexyl, heptyl or octyl, and the corresponding radicals which are substituted, for example, by hydroxyl, $C_1$–$C_4$alkoxy or halogen. $C_1$–$C_4$alkyl, which can be substituted as defined, is preferred here.

$R_1$ and $R_2$ are preferably independently of one another hydrogen, $C_1$–$C_8$alkyl or phenyl, where the alkyl and phenyl radicals can be substituted as defined above.

$R_1$ and $R_2$ are preferably independently of one another hydrogen, $C_1$–$C_4$alkyl which is unsubstituted or substituted by hydroxyl or $C_1$–$C_4$alkoxy, or phenyl which is unsubstituted or substituted by $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl, nitro, sulfamoyl or N—$C_1$–$C_4$alkylsulfamoyl which is unsubstituted or further substituted in the alkyl moiety by hydroxyl or $C_1$–$C_4$alkoxy. In particular, one of the radicals $R_1$ and $R_2$ is hydrogen here.

$R_1$ and $R_2$ are particularly preferably hydrogen, $C_1$–$C_4$alkyl which is unsubstituted or substituted by hydroxyl, or phenyl which is unsubstituted or substituted by sulfo, carboxyl or sulfamoyl. In particular, one of the radicals $R_1$ and $R_2$ is hydrogen here. $R_1$ and $R_2$ are especially preferably independently of one another hydrogen or $C_1$–$C_4$alkyl, in particular hydrogen or methyl.

m is preferably the number 1 or 2, in particular the number 2.

Substituents of phenyl radicals Y and Z are, for example:
$C_1$–$C_{12}$alkyl; $C_1$–$C_4$alkoxy; $C_2$–$C_4$alkanoylamino; hydroxyl; sulfo; nitro; carboxyl; cyano; amino; halogen; benzoylaminomethyl; chloroacetylamino; chloroacetylaminomethyl; α-chloroacryloylaminomethyl; acryloylaminomethyl; or phenoxy, phenylcarbonylamino, phenylsulfonyloxy, phenylsulfonylamino, phenylsulfonylaminomethyl or N-methyl-phenylsulfonylaminomethyl, where the phenyl radicals can be further substituted as defined above for Y and Z. The radical Z furthermore can be an anthraquinone dye radical bonded via a bridge member; examples of these are the anthraquinone dyes of the following formula (11).

$C_1$–$C_8$alkyl radicals Y and Z independently of one another are, for example, methyl, ethyl, propyl, isopropyl, butyl, isobutyl, sec-butyl, tert-butyl, pentyl, hexyl, heptyl or octyl, where the alkyl radicals can be substituted by phenyl and the phenyl radical can be further substituted as defined above for phenyl radicals Y and Z. Preferred substituents of the phenyl radical here are $C_1$–$C_{12}$alkyl, $C_1$–$C_4$alkoxy, $C_2$–$C_4$alkanoylamino, hydroxyl, sulfo, nitro, carboxyl, cyano, amino, halogen, benzoylaminomethyl, chloroacetylamino, chloroacetylaminomethyl, a-chloroacryloylaminomethyl or acryloylaminomethyl.

Cyclohexyl radicals Y and Z independently of one another are, in addition to unsubstituted cyclohexyl, cyclohexyl substituted, for example, by $C_1$–$C_4$alkyl, phenylsulfonylamino or benzyl, where the phenyl radicals can be further substituted, for example, by $C_1$–$C_4$alkyl, $C_1$–$C_4$alkoxy, $C_2$–$C_4$alkanoylamino, sulfo or halogen.

1,2,3,4-Tetrahydronaphthyl radicals Y and Z independently of one another are, in addition to unsubstituted 1,2,3,4-tetrahydronaphthyl, the radical substituted, for example, by sulfo.

If the anthraquinone dye of the formula (2) contains one or two hydroxyl groups in ring V, these are as a rule bonded in the 1- and/or 2-position.

The total number of sulfo groups in the anthraquinone dye of the formula (2) is one or two.

$C_1$–$C_4$alkyl radicals $R_3$ to $R_{16}$ independently of one another are methyl, ethyl, propyl, isopropyl, butyl, isobutyl, sec-butyl or tert-butyl, in particular methyl.

$C_1$–$C_4$alkoxy radicals $R_3$ to $R_{16}$ independently of one another are methoxy, ethoxy, propoxy, isopropoxy, butoxy, sec-butoxy, isobutoxy or tert-butoxy, in particular methoxy.

$C_2$–$C_4$Alkanoylamino radicals $R_3$ to $R_{16}$ independently of one another are, for example, acetylamino or propionylamino, in particular acetylamino. Halogen atoms $R_3$ to $R_{16}$ independently of one another are, for example, fluorine, chlorine or bromine, in particular chlorine.

The formazan compounds of the formula (1) are preferably compounds of the formula

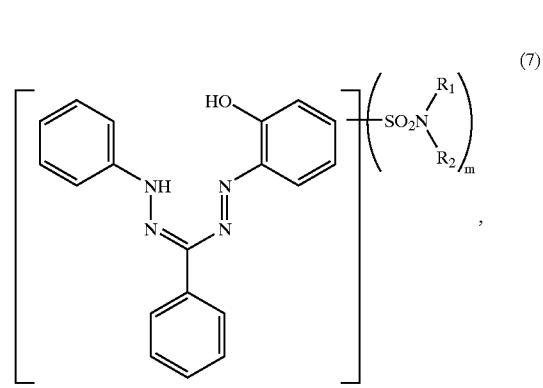

in which $R_1$, $R_2$ and m are as defined and preferred above; and the phenyl radicals can contain no further substituents or are further substituted as defined above for rings I, II, III and IV. Preferably, the phenyl radicals of the compound of the formula (7) may be further substituted by $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl or nitro.

The formazan compounds of the formula (1) are particularly preferably compounds of the formula

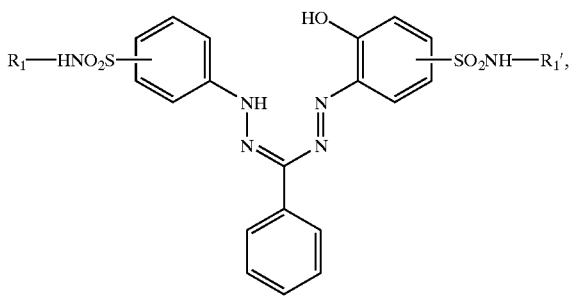

(8)

in which $R_1$ and $R_1'$ independently of one another are hydrogen or $C_1$–$C_4$alkyl and the phenyl radicals contain no further substituents or can be further substituted as defined above for rings I, II, III and IV. Preferably, the phenyl radicals of the compound of the formula (8) may be further substituted by $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl or nitro. The phenyl radicals of the compound of the formula (8) preferably contain no further substituents.

The formazan compounds of the formula (1) are especially preferably compounds of the formula

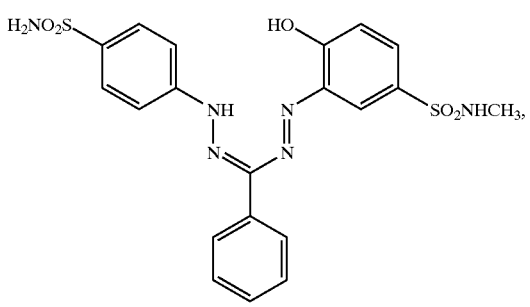

(8a)

in which the phenyl radicals contain no further substituents or can be further substituted as defined above for the compound of the formula (8). Preferably, the phenyl radicals of the compound of the formula (8a) contain no further substituents.

Preferred anthraquinone dyes of the formula (2) are anthraquinone dyes of the formula

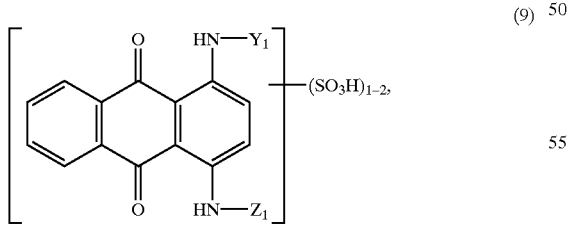

(9)

in which $Z_1$ is phenyl which is unsubstituted or substituted by $C_1$–$C_{12}$alkyl, $C_1$–$C_4$alkoxy, $C_2$–$C_4$alkanoylamino, halogen, benzoylaminomethyl, chloroacetylamino, chloroacetylaminomethyl or α-chloroacryloylaminomethyl; phenyl-$C_1$–$C_8$alkyl, where the phenyl radical contains no further substituents or is substituted as defined for a phenyl radical $Z_1$ under formula (9); cyclohexyl which is unsubstituted or substituted by $C_1$–$C_4$alkyl, phenylsulfonylamino or $C_1$–$C_4$alkylphenylsulfonylamino; 1,2,3,4-tetrahydronaphthyl; or a radical of the formula

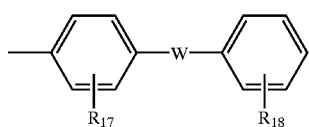

in which

W is a bridge member of the formula —O—, —NH—CO—, —OSO$_2$—, —NH—SO$_2$—, —CH$_2$—NH—SO$_2$— or —CH$_2$—N(CH$_3$)—SO$_2$—, $R_{17}$ is hydrogen, $C_1$–$C_4$alkyl, $C_1$–$C_4$alkoxy or halogen and $R_{18}$ is hydrogen, $C_1$–$C_4$alkyl, $C_1$–$C_4$alkoxy, halogen or acryloylaminomethyl, $Y_1$ is hydrogen; $C_1$–$C_4$alkyl; phenyl which is unsubstituted or substituted by $C_1$–$C_4$alkyl, $C_1$–$C_4$alkoxy or halogen; phenyl-$C_1$–$C_8$alkyl which is unsubstituted or substituted in the phenyl ring by $C_1$–$C_4$alkyl, $C_1$–$C_4$alkoxy, halogen or benzoylaminomethyl; cyclohexyl which is unsubstituted or substituted by $C_1$–$C_4$alkyl; or 1,2,3,4-tetrahydronaphthyl, or anthraquinone dyes of the formula

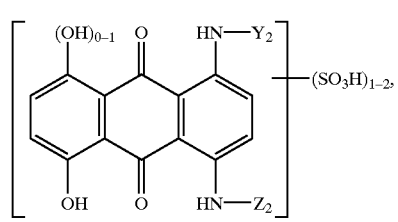

(10)

in which $Z_2$ is phenyl which is unsubstituted or substituted by $C_1$–$C_4$alkyl, $C_1$–$C_4$alkoxy or halogen or cyclohexyl which is unsubstituted or substituted by $C_1$–$C_4$alkyl or benzyl and $Y_2$ is $C_1$–$C_4$alkyl or is as defined above for $Z_2$, or anthraquinone dyes of the formula

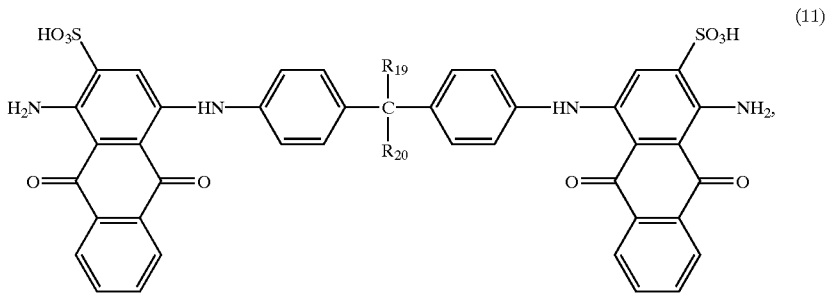
(11)
in which $R_{19}$ and $R_{20}$ are hydrogen or methyl.
Particularly preferred anthraquinone dyes of the formula (2) are anthraquinone dyes of the formula
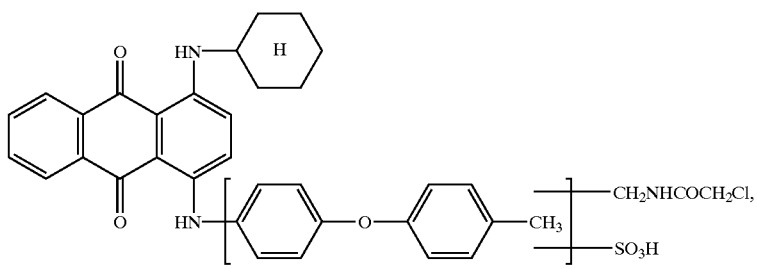
(12)
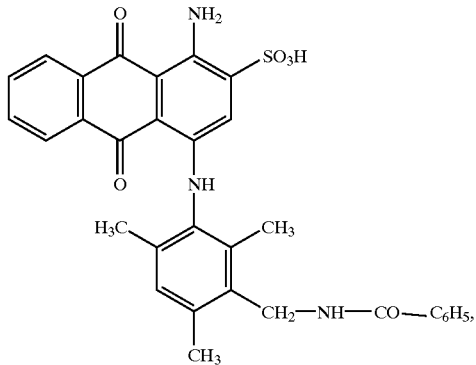
(13)
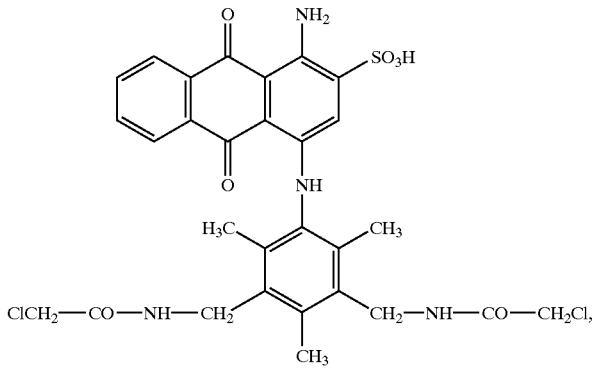
(14)

-continued
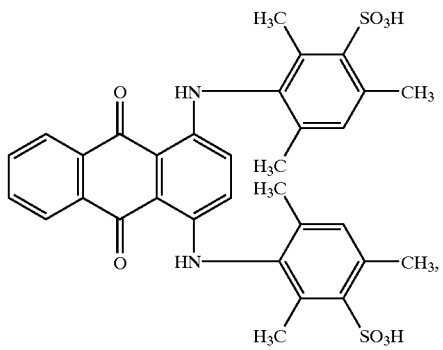
(15)
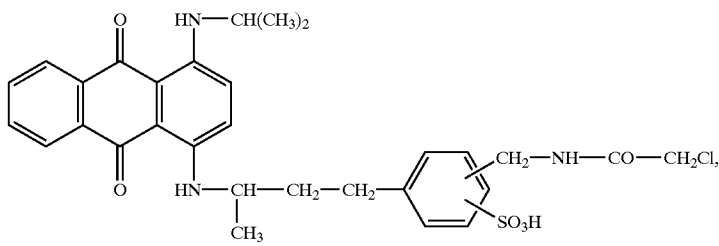
(16)
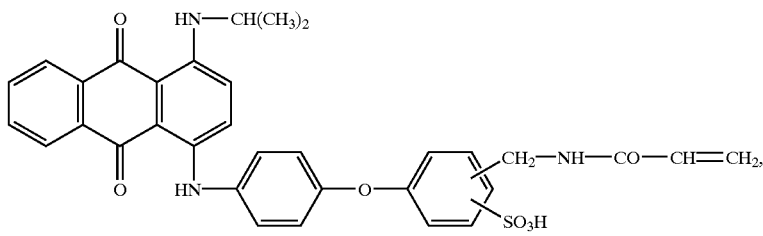
(17)
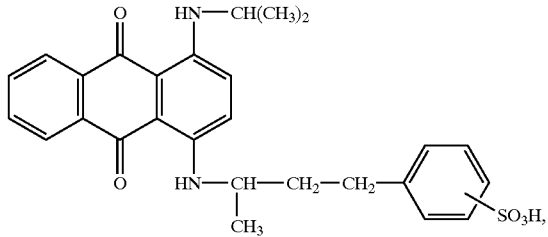
(18)
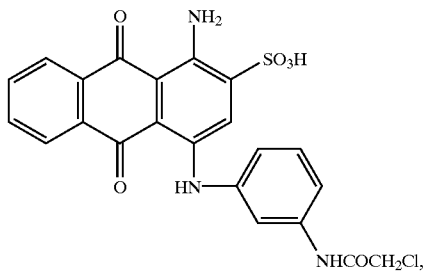
(19)
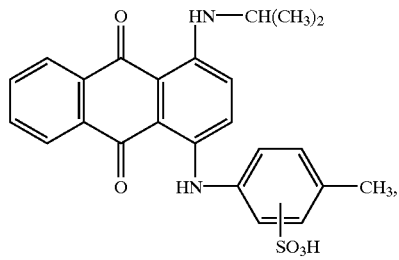
(20)
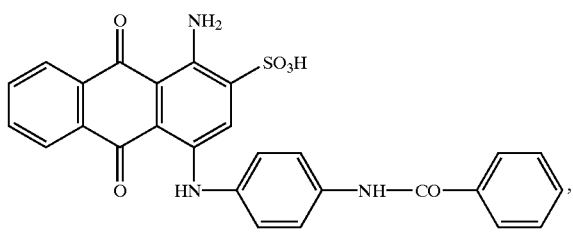
(21)

-continued
(22)
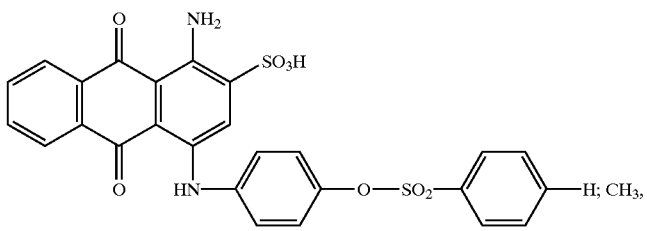
(23)
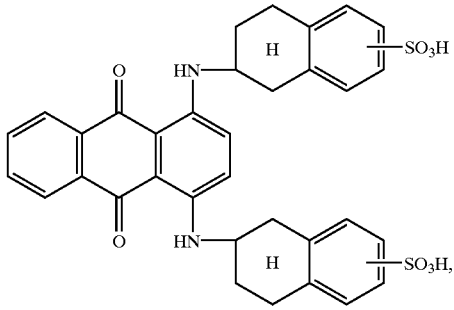
(24)
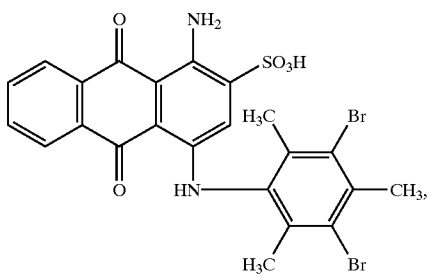
(25)
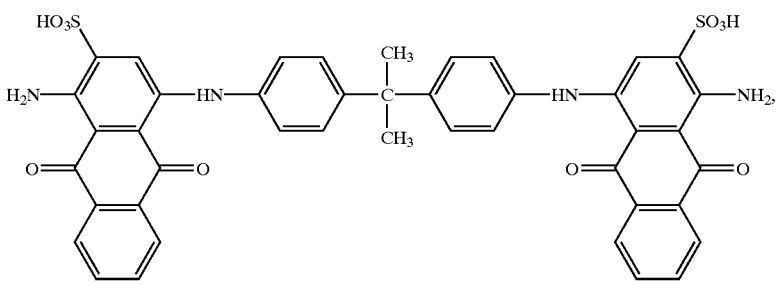
(26)
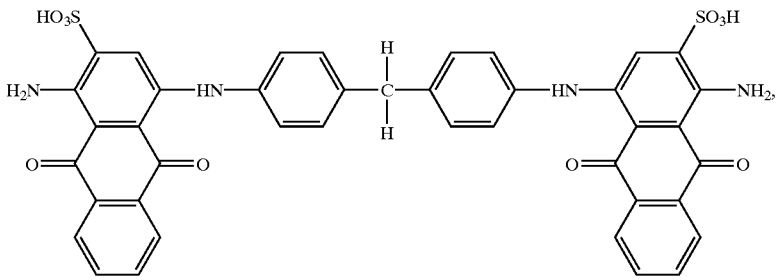
(27)
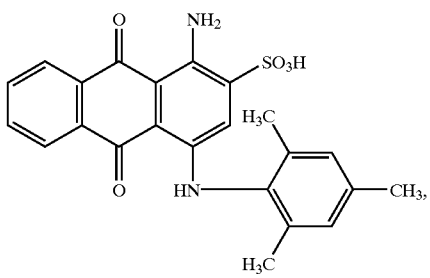
(28)
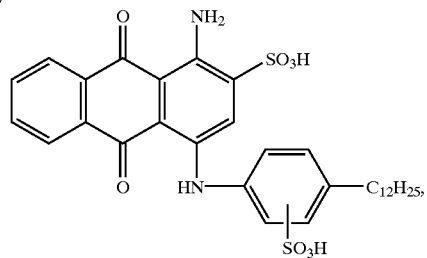

-continued
(29)
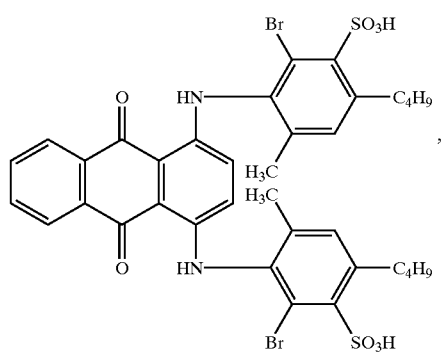
(30)
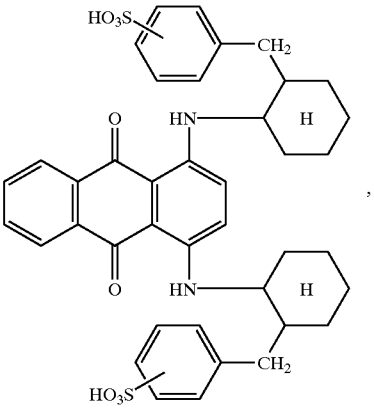
(31)
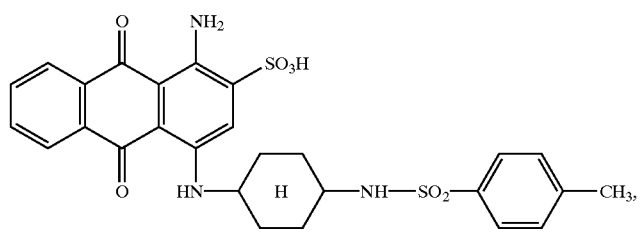
(32)
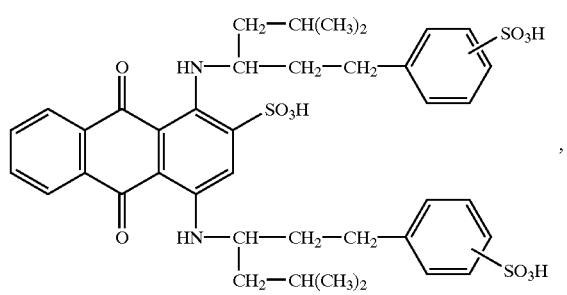
(33)
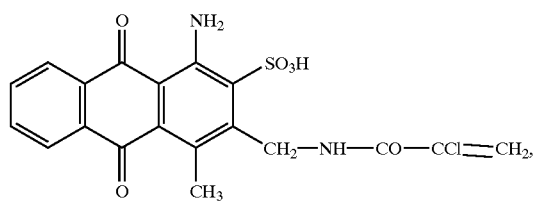
(34)
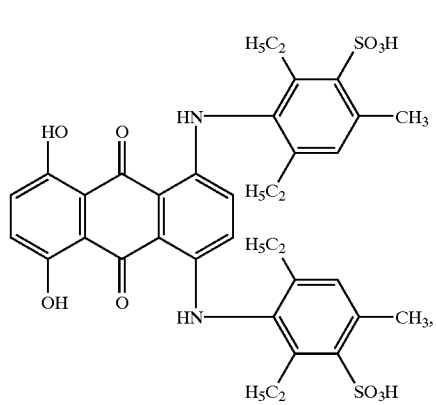
(35)
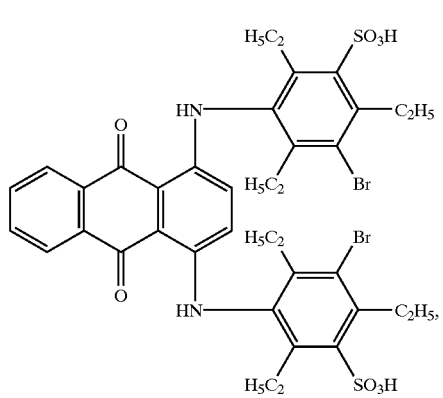

-continued
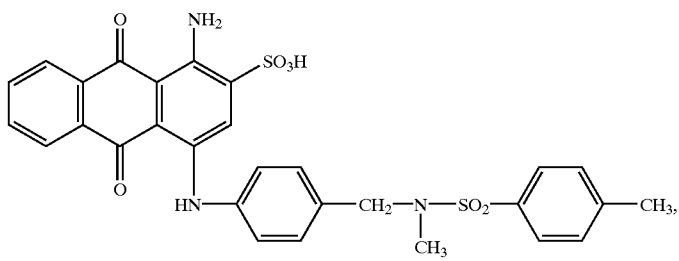
(36)
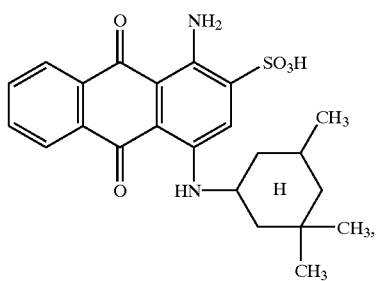
(37)
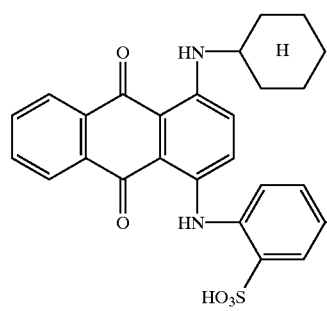
(38)
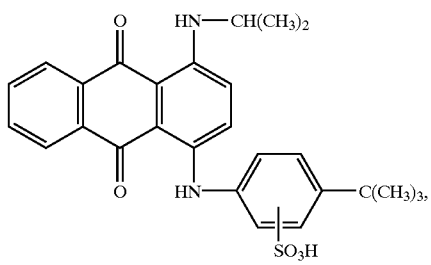
(39)
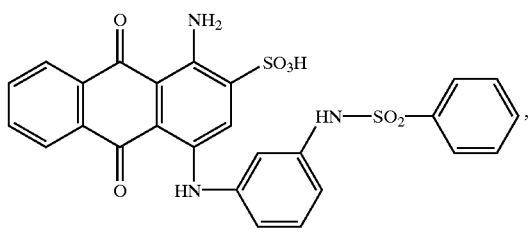
(40)
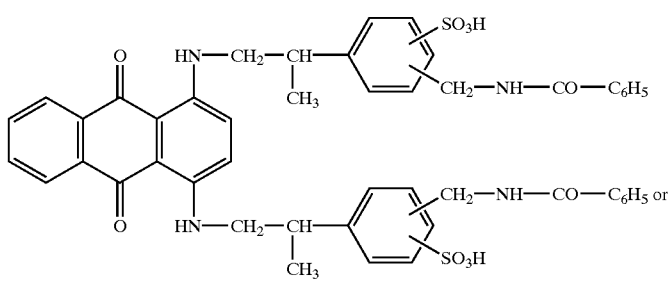
(41)

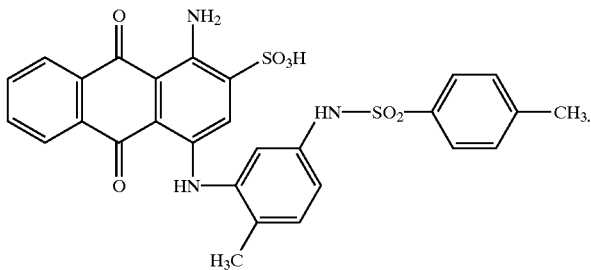
(42)

1:2 chromium or 1:2 cobalt complex azo dyes are, in particular, 1:2 cobalt complex dyes of two identical or different azo compounds from the group comprising compounds of the formulae (3), (4) and (5), and 1:2 chromium complex dyes of two identical or different azo compounds from the group comprising compounds of the formulae (5) and (6).

Particularly preferred 1:2 chromium or 1:2 cobalt complex azo dyes are dyes of the formula

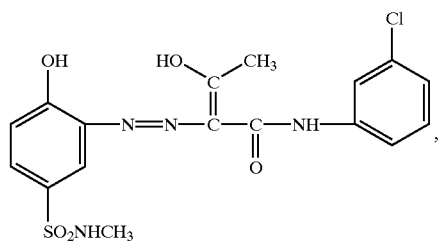
(43)

1:2 cobalt complex

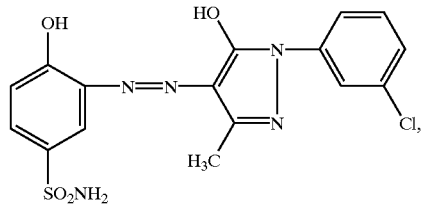
(44)

1:2 cobalt complex

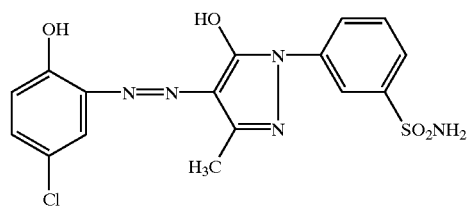
(45)

1:2 cobalt complex

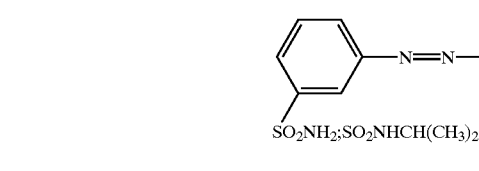

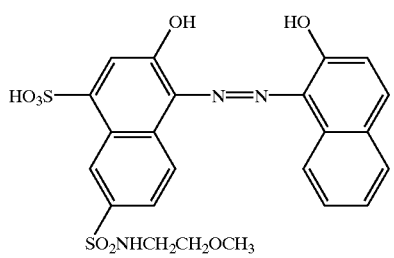
(46)

1:2 cobalt complex

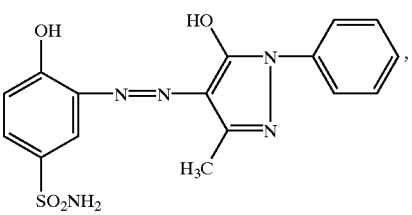
(47)

1:2 chromium complex

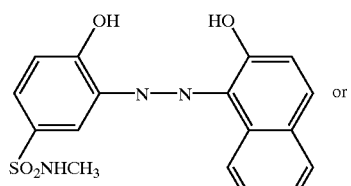
(48)

1:2 cobalt complex

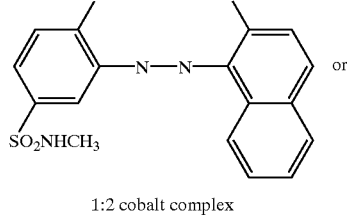
(49)

1:2 cobalt complex (50)

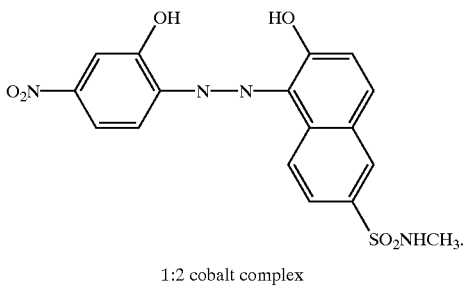

1:2 cobalt complex

Especially preferred dye mixtures are those which comprise, in addition to the 1:2 cobalt complex formazan dye, at least one dye of the formulae (9), (10), (11) and (43) to (50), in particular at least one dye of the formulae (12) to (50). The dye of the formula (50) is especially preferred here. The 1:2 cobalt complex formazan dye here is as defined and preferred above.

The anthraquinone dyes of the formula (2) and the 1:2 chromium and 1:2 cobalt complex azo dyes are known or can be obtained analogously to known compounds. Thus, anthraquinone dyes of the formula (2) can be obtained, for example, analogously to processes defined in GB-A-903 590, GB-A-945 806, GB-A-2 009 214 and U.S. Pat. No. 3,491,125. The 1:2 chromium and 1:2 cobalt complex azo dyes can be obtained, for example, analogously to processes defined in GB-A-716 753, GB-A-719 274, GB-A-745 641 and GB-A-851 861.

Some of the 1:2 cobalt complex formazan dyes of the formula (1) are novel. The 1:2 cobalt complex formazan dyes of the formula (1) can be obtained analogously to the process defined for the preparation of the novel 1:2 cobalt complex formazan dyes.

The dye mixture according to the invention can be prepared, for example, by mixing the individual dyes. This mixing process is carried out, for example, in suitable mills, for example bead and pinned disc mills, and in kneaders or mixers.

The dye mixtures furthermore can be prepared, for example, by spray drying the aqueous dye mixtures.

The dye mixtures preferably comprise 5 to 95% by weight, in particular 10 to 90% by weight and preferably 20 to 80% by weight, of the 1:2 cobalt complex formazan dye, based on the total amount of the dyes of the mixtures.

If they contain sulfo groups, the individual dyes are present in the dye mixtures according to the invention either in the form of their free sulfonic acid or, preferably, as salts thereof, for example alkali metal, alkaline earth metal or ammonium salts or as salts of an organic amine. Examples are the sodium, lithium or ammonium salts or the salt of triethanolamine. Counter-ions of metal complex dyes having a negative charge are, for example, the cations of the abovementioned salts.

The dye mixtures as a rule contain further additives, for example sodium chloride or dextrin.

The invention furthermore relates to a process for dyeing or printing fibre materials containing hydroxyl groups or containing nitrogen using the dye mixtures according to the invention.

Fibre materials are preferably both natural polyamide fibre materials, for example silk or, in particular, wool, and synthetic polyamide fibre materials, for example polyamide 6 or polyamide 6.6, or wool- or polyamide-containing blend fabrics. Synthetic polyamide fibre materials are of particular interest here.

The fibre material mentioned can be in widely varying processing forms, for example as fibres, yarn, woven fabric or knitted fabric, and in particular in the form of carpets.

The dyeing or printing can be carried out in customary dyeing or printing apparatuses. The dye liquors or printing pastes can comprise further additives, for example wetting agents, antifoams, levelling agents or agents which influence the property of the textile material, for example softening agents, additives for flameproofing or soil-, water- and oil-repellent agents, as well as water-softening agents and natural or synthetic thickeners, for example alginates and cellulose ethers.

The dye mixtures according to the invention give level dyeings having good all-round properties, in particular good fastness to rubbing, wet processing, wet rubbing, light and hot light. The dye mixtures according to the invention furthermore have a good water-solubility and resistance to hard water and are distinguished by good affinity properties and good combinability with other dyes.

The invention furthermore relates to symmetric 1:2 cobalt complex formazan dyes of compounds of the formula

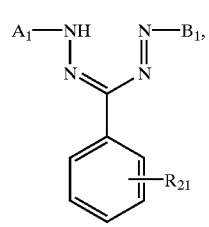
(51)

in which
$R_{21}$ is hydrogen, halogen or $C_1$–$C_4$alkylsulfonyl which is unsubstituted or hydroxyl-substituted and a) $A_1$ is a radical of the formula

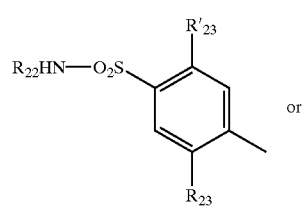
(52)

or

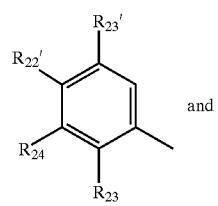
(53)

and $B_1$ is a radical of the formula

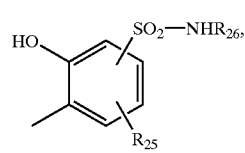
(54)

in which
$R_{22}$ is hydrogen or unsubstituted or hydroxyl-substituted $C_1$–$C_4$alkyl, $R_{22}'$ is hydrogen or $C_1$–$C_4$alkyl, $R_{23}$ and $R_{23}'$ independently of one another are each hydrogen, $C_1$–$C_4$alkyl or halogen, $R_{24}$ is $C_1$–$C_4$alkanoylamino or N—$C_1$–$C_4$alkylsulfamoyl which is unsubstituted or substituted in the alkyl moiety by hydroxyl, $R_{25}$ is hydrogen or halogen and $R_{26}$ is hydrogen, unsubstituted or hydroxyl-substituted $C_1$–$C_4$alkyl or phenyl which is unsubstituted or substituted by sulfo, carboxyl or sulfamoyl, or b) $A_1$ is a radical of the formula

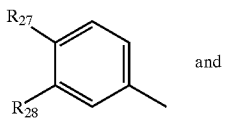 (55)

and $B_1$ is a radical of the formula

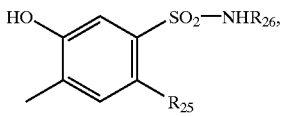 (56)

in which $R_{27}$ is hydrogen or halogen, $R_{28}$ is hydrogen or sulfamoyl and $R_{25}$ and $R_{26}$ independently are as defined above.

$C_1$–$C_4$alkyl here is generally methyl, ethyl, n- or isopropyl or n, iso-, sec- or tert-butyl, and preferably methyl or ethyl. Examples of unsubstituted or hydroxyl-substituted $C_1$–$C_4$alkyl are, in particular, methyl, ethyl or 2-hydroxyethyl. Halogen is generally, for example, fluorine, bromine or, in particular, chlorine. Examples of unsubstituted or hydroxyl-substituted $C_1$–$C_4$alkylsulfonyl are methylsulfonyl, ethylsulfonyl or 2-hydroxyethylsulfonyl. Examples of $C_1$–$C_4$alkanoylamino are acetylamino or propionylamino.

Preferred embodiments of the present invention relate to:

a) symmetric 1:2 cobalt complex formazan dyes of compounds of the formula

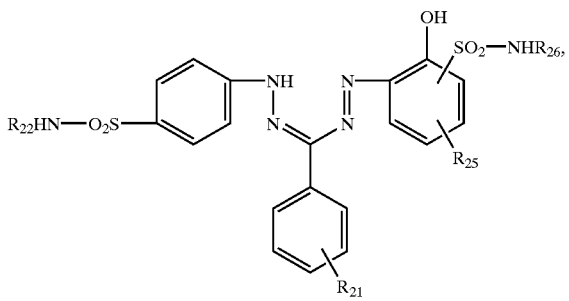 (51a)

in which $R_{21}$ is hydrogen, chlorine or fluorine, $R_{22}$ is hydrogen, methyl, ethyl or 2-hydroxyethyl, $R_{25}$ is hydrogen or chlorine and $R_{26}$ is hydrogen, methyl, ethyl, 2-hydroxyethyl, phenyl, 2- or 3-carboxyphenyl, 2- or 3-sulfamoylphenyl or 2- or 3-sulfophenyl.

b) symmetric 1:2 cobalt complex formazan dyes of compounds of the formula (51a) defined above, in which $R_{21}$ is hydrogen, chlorine or fluorine, $R_{22}$ is hydrogen, methyl or ethyl, $R_{25}$ is chlorine and $R_{26}$ is hydrogen, methyl, ethyl, 2-carboxyphenyl, 2-sulfamoylphenyl or 2-sulfophenyl.

c) symmetric 1:2 cobalt complex formazan dyes of compounds of the formula

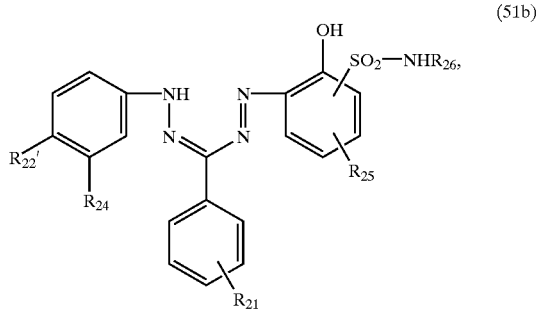 (51b)

in which $R_{21}$ is hydrogen or chlorine, $R_{22}'$ is hydrogen, methyl or ethyl, $R_{24}'$ is N-methylsulfamoyl, N-ethylsulfamoyl or N-2-hydroxyethylsulfamoyl, $R_{25}$ is hydrogen or chlorine and $R_{26}$ is hydrogen, methyl or ethyl.

d) symmetric 1:2 cobalt complex formazan dyes of compounds of the formula (51b) defined above, in which $R_{21}$ is hydrogen, $R_{22}'$ is hydrogen, $R_{24}$ is acetylamino or, in particular, propionylamino, $R_{25}$ is hydrogen or chlorine and $R_{26}$ is hydrogen, methyl or ethyl.

e) symmetric 1:2 cobalt complex formazan dyes of compounds of the formula

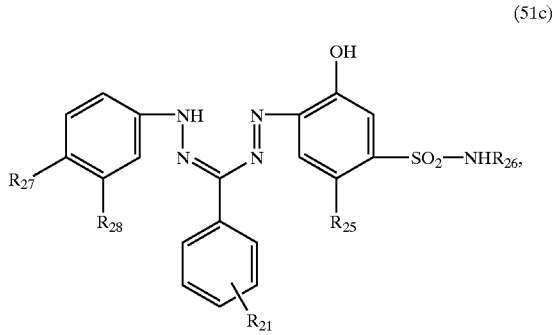 (51c)

in which $R_{21}$ is hydrogen, methylsulfonyl, ethylsulfonyl or 2-hydroxyethylsulfonyl, $R_{25}$ is hydrogen or chlorine, $R_{26}$ is hydrogen, methyl, ethyl, 2-sulfophenyl, 2-carboxyphenyl or 2-sulfamoylphenyl, $R_{27}$ is hydrogen or chlorine and $R_{28}$ is hydrogen or sulfamoyl.

f) Symmetric 1:2 cobalt complex formazan dyes of the formula (51d)

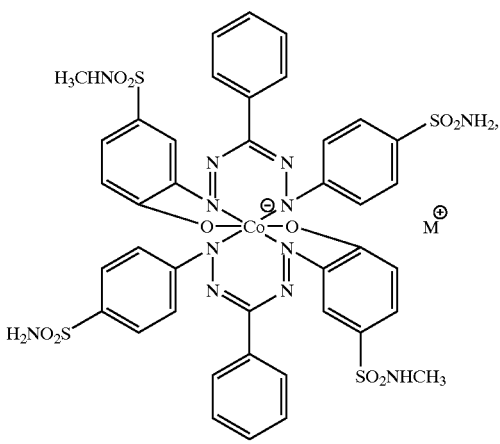

in which $M^{\oplus}$ is a cation. A cation $M^{\oplus}$ is, for example, a proton or, preferably, a metal cation, for example an alkali metal cation, such as $Na^{\oplus}$, $K^{\oplus}$ or $Li^{\oplus}$ furthermore can be an ammonium cation or the ammonium salt of an organic amine, for example the salt of mono-, di- or triethanolamine.

The compounds of the formula (51) can be prepared in a manner which is known per se, for example by diazotizing a compound of the formula

 (57), coupling the product to the hydrazone of the formula

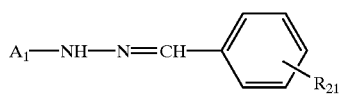 (58)

and metallizing the resulting metal-free compound with a cobalt salt, in which the variables $R_{21}$, $A_1$ and $B_1$ are as defined under formula (51).

The diazotization of the amine of the formula (57) is as a rule carried out by the action of nitrous acid in aqueous-mineral acid solution at a low temperature, and the coupling to the coupling component of the formula (58) is advantageously carried out at alkaline pH values, for example at pH$\geq$9 and in particular at a pH of 10 to 12.

The metallization takes place, for example, in an aqueous medium which has an alkaline pH, for example a value of 7.5 to 12, and preferably 8 to 12, at a temperature of 40 to 100° C., and in particular at 40 to 60° C. Suitable cobalt salts are, for example, the acetate, nitrate, chloride or, in particular, the sulfate.

The coupling of the diazotized compound of the formula (57) to the compound of the formula (58) and the metallization can be carried out in succession or also simultaneously, for example by adding the diazo suspension together with the cobalt salt to the solution of the hydrazone.

The compounds of the formulae (57) and (58) are known per se or can be prepared analogously to known compounds.

The dyes according to the invention as a rule contain further additives, for example sodium chloride or dextrin.

The invention furthermore relates to a process for dyeing or printing fibre materials containing hydroxyl groups or containing nitrogen with the dyes according to the invention.

Preferred fibre materials are both natural polyamide fibre materials, for example silk or, in particular, wool, and synthetic polyamide fibre materials, for example polyamide 6 or polyamide 6.6, or wool- or polyamide-containing blend fabrics. Synthetic polyamide fibre materials are of particular interest here.

The fibre material mentioned can be in widely varying processing forms, for example as fibres, yarn, woven fabric or knitted fabric, and in particular in the form of carpets.

The dyeing or printing can be carried out in customary dyeing or printing apparatuses. The dye liquors or printing pastes can comprise further additives, for example wetting agents, antifoams, levelling agents or agents which influence the property of the textile material, for example softening agents, additives for flameproofing or soil-, water- and oil-repellent agents, as well as water-softening agents and natural or synthetic thickeners, for example alginates and cellulose ethers.

The dyes according to the invention give level dyeings having good all-round properties, in particular good fastness to rubbing, wet processing, wet rubbing, light and hot light. The dyes according to the invention furthermore have a good water-solubility and resistance to hard water and are distinguished by good affinity properties and by good combinability with other dyes.

In the following examples, parts are by weight. The temperatures are degrees Celsius. Parts by weight bear the same relation to parts by volume as the gram to the cubic centimeter.

EXAMPLE 1A

For preparation of a dye mixture which comprises the dyes of the formulae

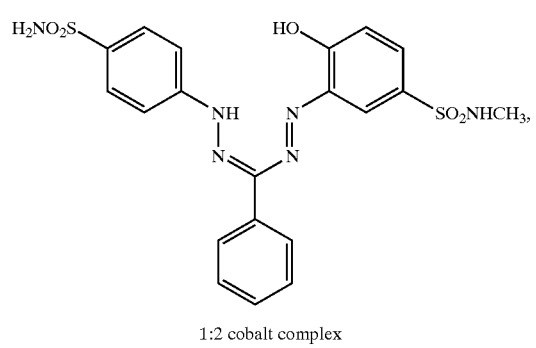

(101)

1:2 cobalt complex

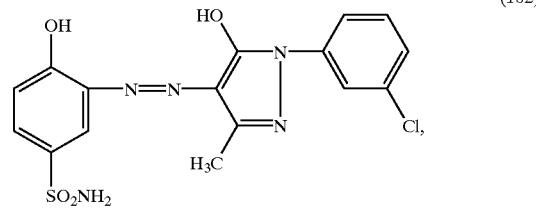

(102)

1:2 cobalt complex

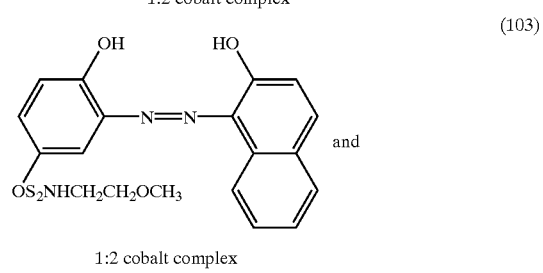

(103)

and

1:2 cobalt complex

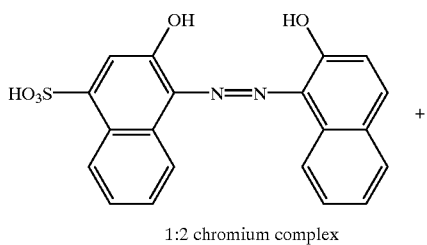

(104)

1:2 chromium complex

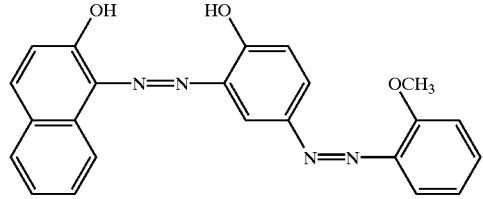

55 parts of the dye of the formula (101), 13 parts of the dye of the formula (102), 14 parts of the dye of the formula (103) and 18 parts of the dye of the formula (104) are homogeneously mixed in a mixer to give 100 parts of the mixture called dye mixture A below.

EXAMPLE 1B

To prepare a dye mixture comprising the dyes of the formulae (101) and (103) and the dye of the formula

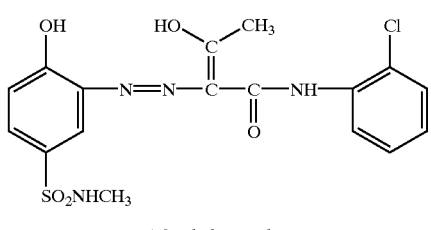

(105)

1,2 cobalt complex 22 parts of the dye of the formula (101), 47 parts of the dye of the formula (103) and 31 parts of the dye of the formula (105) are homogeneously mixed in a mixer to give 100 parts of the mixture called dye mixture B below.

EXAMPLE 1C

To prepare a dye mixture which comprises the dyes of the formulae (101), (102) and (103), 20 parts of the dye of the formula (101), 35 parts of the dye of the formula (102) and 45 parts of the dye of the formula (103) are homogeneously mixed in a mixer to give 100 parts of the mixture called dye mixture C below.

EXAMPLE 1D

To prepare a dye mixture which comprises the dyes of the formulae (101) and (105) and the dye of the formula

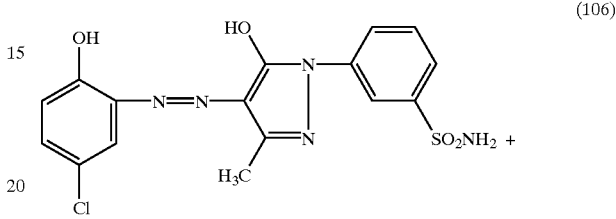

(106)

1:2 cobalt complex

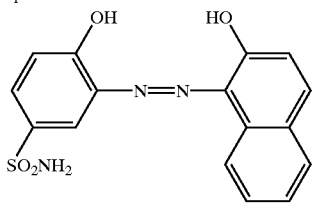

22 parts of the dye of the formula (101), 32 parts of the dye of the formula (105) and 46 parts of the dye of the formula (106) are homogeneously mixed in a mixer to give 100 parts of the mixture called dye mixture D below.

EXAMPLE 1E

To prepare a dye mixture which comprises the dyes of the formulae (101), (102) and (106), 21 parts of the dye of the formula (101), 36 parts of the dye of the formula (102) and 43 parts of the dye of the formula (106) are homogeneously mixed in a mixer to give 100 parts of the mixture called dye mixture E below.

EXAMPLE 1F

To prepare a dye mixture which comprises the dyes of the formulae (101) and (106) and the dyes of the formulae (107)

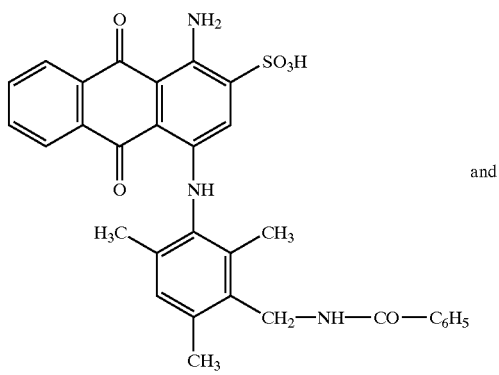

and (108)

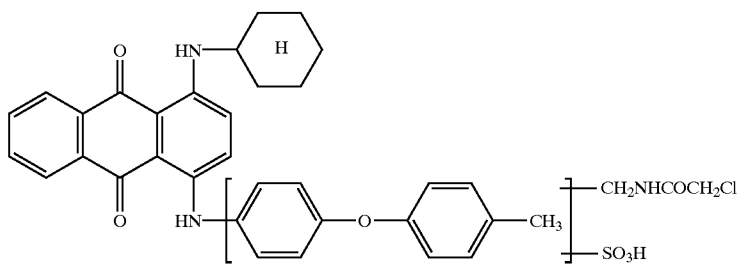

40 parts of the dye of the formula (101), 7 parts of the dye of the formula (106), 40 parts of the dye of the formula (107) and 13 parts of the dye of the formula (108) are homogeneously mixed in a mixer to give 100 pails of the mixture called dye mixture F below.

EXAMPLE 1G

To prepare a dye mixture which comprises the dyes of the formulae (101), (106) and (107), 41 parts of the dye of the formula (101), 4 parts of the dye of the formula (106) and 55 parts of the dye of the formula (107) are homogeneously mixed in a mixer to give 100 parts of the mixture called dye mixture G below.

EXAMPLE 1H

To prepare a dye mixture which comprises the dye of the formula (101) and the dye of the formula (109)

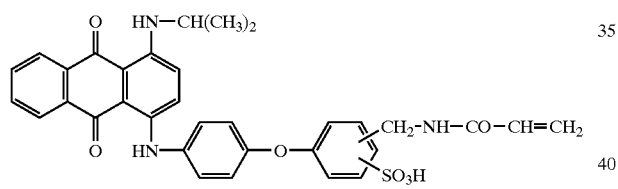

45 parts of the dye of the formula (101) and 55 parts of the dye of the formula (109) are homogeneously mixed in a mixer to give 100 parts of the mixture called dye mixture H below.

EXAMPLE 1I

To prepare a dye mixture which comprises the dye of the formula (101) and the dye of the formula (110)

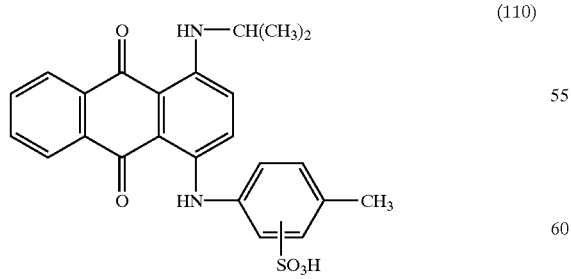

45 parts of the dye of the formula (101) and 55 parts of the dye of the formula (110) are homogeneously mixed in a mixer to give 100 parts of the mixture called dye mixture I below.

EXAMPLE 1J

To prepare a dye mixture which comprises the dye of the formula (101), the dye of the formula (111)

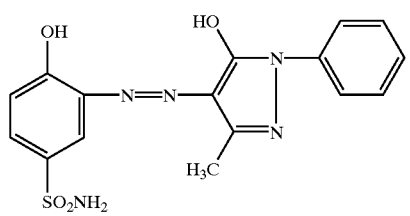

1:2 cobalt complex
and the dye of the formula (112)

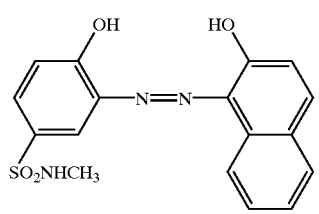

1:2 cobalt complex 22 parts of the dye of the formula (101), 31 parts of the dye of the formula (111) and 47 parts of the dye of the formula (112) are homogeneously mixed in a mixer to give 100 parts of the mixture called dye mixture J below.

EXAMPLE 1K

To prepare a dye mixture which comprises the dye of the formula (113)

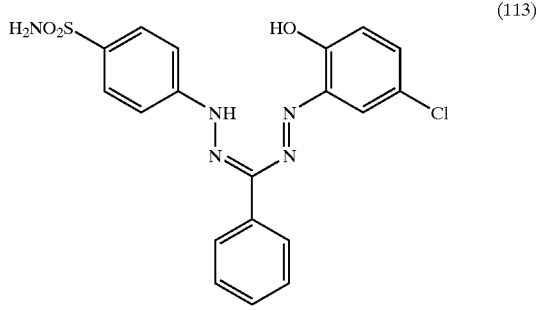

1:2 cobalt complex
and the dye of the formula

-continued

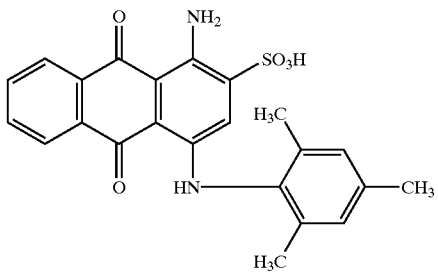
(114)

30 parts of the dye of the formula (113) and 70 parts of the dye of the formula (114) are homogeneously mixed in a mixer to give 100 parts of the mixture called dye mixture K below.

EXAMPLE 1L

To prepare a dye mixture which comprises the dye of the formula (101) and the dye of the formula

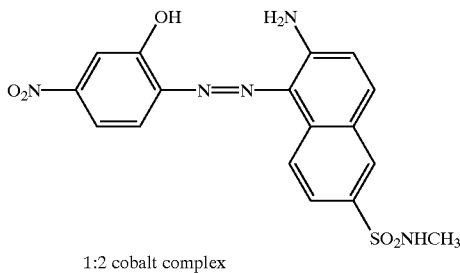
(115)

1:2 cobalt complex 50 parts of the dye of the formula (101) and 50 parts of the dye of the formula (115) are homogeneously mixed in a mixer to give 100 parts of the mixture called dye mixture L below.

EXAMPLE 2

86.1 g of 4-sulfamoylaniline are introduced into 200 ml of water, the pH is brought to about 11.5 with sodium hydroxide solution and the mixture is heated at about 50° C. until a solution has formed. 125 ml of 4N sodium nitrite solution are allowed to run rapidly into this solution. After the temperature has dropped to about 35 to 40° C., the resulting solution is allowed to run into a cold mixture, at −5 to 0° C., of 100 g of ice and 400 ml of 31% naphthalene-1-sulfonic acid solution. The mixture is kept at 0 to 2° C. for about 1 hour, a little more nitrite solution is added if appropriate, and at the end the excess nitrite is destroyed with sulfamic acid.

The pH of the solution obtained above is brought to 4.5 to 5 with sodium hydroxide solution, and a suspension of 104.6 g of sodium pyrosulfite in 100 ml of water is then added dropwise at 0 to 5° C. in the course of about 30 to 45 minutes; during this addition, the pH is kept at 6 to 6.5 by addition of sodium hydroxide solution. The mixture is subsequently stirred at about 5° C. for 1 hour, at 40 to 50° C. for a further 2 hours and finally at room temperature overnight. After addition of HCl (pH <1), the $SO_2$ formed is driven off with compressed air. The hydrazine-containing mixture is heated to 60 to 70° C. and 50 ml of benzaldehyde are added dropwise in the course of about 15 minutes. The mixture is subsequently stirred at 65 to 70° C. for about 2 to 2.5 hours and cooled to room temperature, and the compound which has crystallized out, of the formula

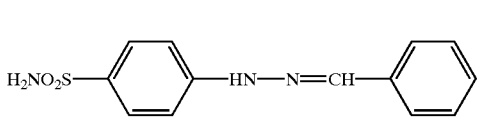
(116)

is filtered off. After washing with water and hydrochloric acid, the product is dried in vacuo.

EXAMPLE 3

30.3 g of 2-amino-4-N-methylsulfamoylphenol are dissolved in 180 ml of water, the pH is rendered acid with HCl and the temperature is cooled to 0 to 5° C. 37.5 ml of 4N sodium nitrite solution are added at this temperature and the amino compound is diazotized.

After the excess nitrite has been destroyed with sulfamic acid and the pH has been increased to 3 with sodium hydroxide solution, the diazo suspension is added in small portions, in the course of about 1.5 hours, to a solution, which has been brought to pH 12.3 to 12.5 with sodium hydroxide solution, of 41.3 g of the hydrazone obtained according to Example 2 in about 350 ml of water at 40 to 45° C. and the pH is kept at 12.3 to 12.5 by addition of sodium hydroxide solution. The mixture is subsequently stirred at 40 to 45° C. for about 30 minutes, the pH is lowered to about 9.5 with hydrochloric acid and the metal-free dye of the formula

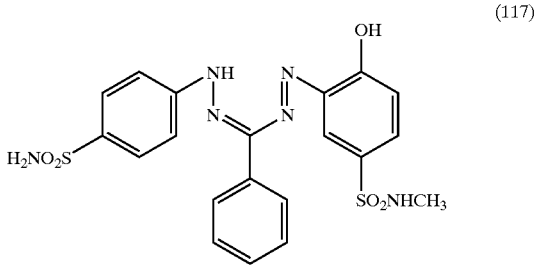
(117)

is filtered off, after cooling, and washed with sodium chloride solution.

EXAMPLE 4

The crude dye obtained according to Example 3 is homogeneously suspended in 600 ml of water and the suspension is heated to about 60 to 70° C. The pH is brought to about 8.5 to 9.5 with sodium carbonate solution, and 70 ml of 1 molar $CoSO_4$/tartaric acid solution are added dropwise at 60 to 65° C. in the course of about 30 minutes, while stirring, the pH being kept between 8.5 and 9 by addition of further sodium carbonate solution. The colour shade changes from red to blue and the 1:2 Co complex crystallizes out. The pH is brought to 11 to 11.5 with sodium hydroxide solution, stirring is continued for about 30 minutes, the pH is lowered to about 9.5 with hydrochloric acid, the compound of the formula

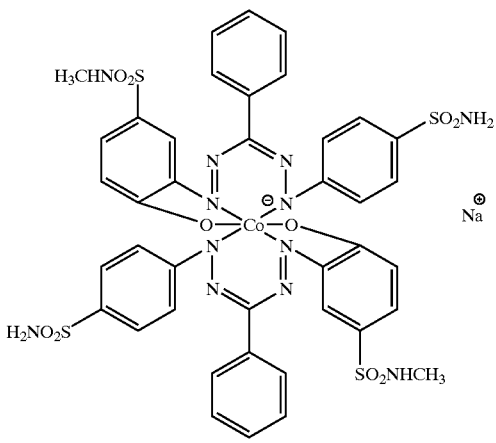

(118)

is filtered off and the precipitate is washed with sodium chloride solution. Examples 5 to 34: The symmetric 1:2 cobalt complexes of compounds of the general formula

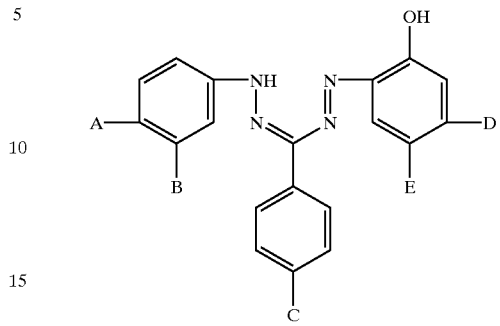

in which the variables are as defined in the table, can be prepared analogously to those in Examples 2 to 4:

| Example No. | A | B | C | D | E |
|---|---|---|---|---|---|
| 5 | SO$_2$NH$_2$ | H | H | SO$_2$NHCH$_3$ | H |
| 6 | SO$_2$NH$_2$ | H | H | H | SO$_2$NH$_2$ |
| 7 | SO$_2$NH$_2$ | H | H | SO$_2$NH$_2$ | H |
| 8 | SO$_2$NH$_2$ | H | H | SO$_2$NHCH$_3$ | Cl |
| 9 | SO$_2$NH$_2$ | H | H | SO$_2$NH$_2$ | Cl |
| 10 | SO$_2$NH$_2$ | H | H | —SO$_2$NH—C$_6$H$_3$(SO$_3$H)— | H |
| 11 | SO$_2$NH$_2$ | H | Cl | H | —SO$_2$NH—C$_6$H$_3$(SO$_2$NH$_2$)— |
| 12 | SO$_2$NHCH$_3$ | H | H | H | SO$_2$NH$_2$ |
| 13 | SO$_2$NH$_2$ | H | Cl | SO$_2$NH$_2$ | Cl |
| 14 | SO$_2$NH$_2$ | H | Cl | SO$_2$NHCH$_3$ | Cl |
| 15 | SO$_2$NH$_2$ | H | F | SO$_2$NH$_2$ | Cl |
| 16 | SO$_2$NH$_2$ | H | F | SO$_2$NHCH$_3$ | Cl |
| 17 | H | SO$_2$NH$_2$ | H | SO$_2$NH$_2$ | Cl |
| 18 | H | SO$_2$NH$_2$ | H | SO$_2$NHCH$_3$ | Cl |
| 19 | H | SO$_2$NH$_2$ | H | H | —SO$_2$NH—C$_6$H$_3$(COOH)— |
| 20 | CH$_3$ | SO$_2$NHC$_2$H$_5$OH | H | SO$_2$NH$_2$ | Cl |
| 21 | CH$_3$ | SO$_2$NHC$_2$H$_5$OH | H | SO$_2$NHCH$_3$ | Cl |
| 22 | CH$_3$ | SO$_2$NHC$_2$H$_5$OH | Cl | SO$_2$NHCH$_3$ | Cl |
| 23 | CH$_3$ | SO$_2$NHC$_2$H$_5$OH | Cl | SO$_2$NH$_2$ | Cl |
| 24 | H | NHCOC$_2$H$_5$ | H | H | SO$_2$NH$_2$ |
| 25 | H | NHCOC$_2$H$_5$ | H | H | SO$_2$NHCH$_3$ |
| 26 | H | NHCOC$_2$H$_5$ | H | SO$_2$NH$_2$ | Cl |
| 27 | H | NHCOC$_2$H$_5$ | H | SO$_2$NHCH$_3$ | Cl |
| 28 | Cl | H | H | SO$_2$NH$_2$ | H |
| 29 | Cl | H | H | SO$_2$NH$_2$ | Cl |

-continued

| Example No. | A | B | C | D | E |
|---|---|---|---|---|---|
| 30 | Cl | H | H | SO$_2$NHCH$_3$ | Cl |
| 31 | Cl | H | H | —SO$_2$NH—(2-SO$_3$H-phenyl) | H |
| 32 | SO$_2$NH$_2$ | H | H | H | —SO$_2$NH—(2-COOH-phenyl) |
| 33 | H | H | SO$_2$C$_2$H$_5$OH | SO$_2$NHCH$_3$ | Cl |
| 34 | H | SO$_2$NH$_2$ | H | —SO$_2$NH—(2-SO$_3$H-phenyl) | H |

EXAMPLES 35 TO 38

The symmetric 1:2 cobalt complexes of the compounds of the general formula

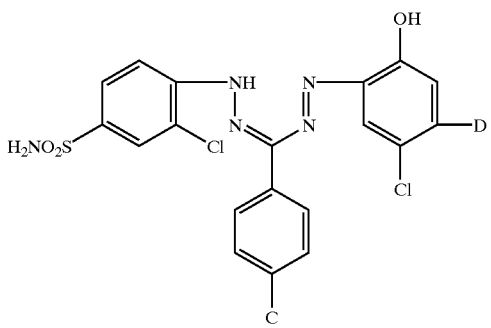

in which the variables C and D are as defined in the table, can be prepared analogously to those in Examples 2 to 4:

| Example No. | C | D |
|---|---|---|
| 35 | H | SO$_2$NH$_2$ |
| 36 | H | SO$_2$NHCH$_3$ |
| 37 | Cl | SO$_2$NH$_2$ |
| 38 | Cl | SO$_2$NHCH$_3$ |

EXAMPLES 39 TO 42

The symmetric 1:2 cobalt complexes of the compounds of the general formula

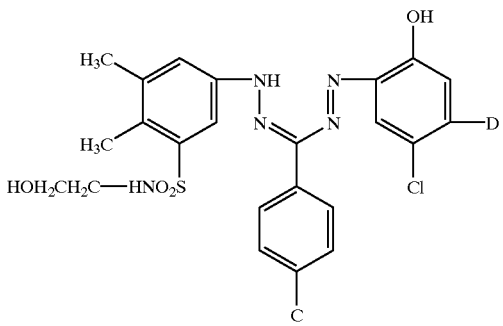

in which the variables C and D are as defined in the table, can be prepared analogously to those in Examples 2 to 4:

| Example No. | C | D |
|---|---|---|
| 39 | H | SO$_2$NH$_2$ |
| 40 | H | SO$_2$NHCH$_3$ |
| 41 | Cl | SO$_2$NH$_2$ |
| 42 | Cl | SO$_2$NHCH$_3$ |

Dyeing Example 1

10 parts of polyamide 6.6 woven fabric are dyed in 200 parts of an aqueous liquor which comprises 0.27%, based on the fibre weight, of dye mixture A according to Example 1A and is brought to pH 6 with acetic acid and sodium acetate. The dyebath is heated to 98° C. in the course of 45 minutes, kept at 96° C. to 98° C. for 60 minutes and then cooled to 70° C. in the course of 15 minutes. The dyed woven fabric is then removed and rinsed and dried in the customary manner. A woven fabric dyed in a grey colour shade is obtained.

Dyeing Examples 2 to 7

The procedure described in Dyeing Example 1 is repeated, except that the dye mixtures defined in column 2 in the following Table 1 are used in place of dye mixture A, affording polyamide 6.6 woven fabrics dyed in the colour shades defined in column 3.

TABLE 1

| Example | Dye mixture | Colour shade on polyamide |
| --- | --- | --- |
| 2 | 1.06% of dye mixture B | brown |
| 3 | 1.13% of dye mixture C | brown |
| 4 | 1.03% of dye mixture D | brown |
| 5 | 1.10% of dye mixture E | brown |
| 6 | 1.06% of dye mixture J | brown |
| 7 | 1.06% of dye mixture L | brown |

The procedure described in Dyeing Examples 1 to 7 is repeated, except that in each case corresponding dye mixtures which comprise the dye of the formula

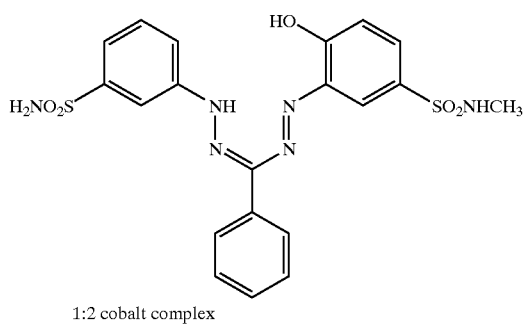

(117)

1:2 cobalt complex in the same amount by weight in place of the dye of the formula (101) are used, affording polyamide 6.6 woven fabrics dyed in the colour shades defined in the particular examples.

Dyeing Example 8

10 parts of polyamide 6.6 woven fabric are dyed in 200 parts of an aqueous liquor which comprises 1.5%, based on the fibre weight, of dye mixture F according to Example 1F and is brought to pH 6 with phosphate buffer ($NaH_2PO_4$/$Na_2HPO_4$). The dyebath is heated to 98° C. in the course of 45 minutes and left at this temperature for 60 minutes. The dyed woven fabric is then removed and rinsed and dyed in the customary manner. A woven fabric dyed in a blue colour shade is obtained.

Dyeing Examples 9 to 12

The procedure in Dyeing Example 8 is repeated, except that the dye mixtures defined in column 2 in the following Table 2 are used in place of dye mixture F, affording polyamide 6.6 woven fabrics dyed in the colour shades defined in column 3.

TABLE 2

| Example | Dye mixture | Colour shade on polyamide |
| --- | --- | --- |
| 9 | 1.75% of dye mixture G | blue |
| 10 | 1.5% of dye mixture H | blue |
| 11 | 1.5% of dye mixture I | blue |
| 12 | 1.5% of dye mixture K | blue |

The procedure described in Dyeing Examples 8 to 12 is repeated, except that in each case corresponding dye mixtures which comprise the dye of the formula (117) in the same amount by weight in place of the dye of the formula (101) are used, affording polyamide 6.6 woven fabrics dyed in the colour shades defined in the particular examples.

Dyeing Example 13

10 parts of polyamide 6.6 fibre material (Helanca tricot) are dyed in 500 parts of an aqueous liquor which comprises 2 g/l of ammonium acetate and 0.5%, based on the fibre weight, of the blue dye of the formula (118) according to Example 4 and is brought to pH 5 with acetic acid.

The dyeing time at a temperature of 98° C. is 30 to 90 minutes. The dyed polyamide fibre material is then removed and rinsed and dried in the customary manner. A piece of woven fabric which is dyed completely levelly in a blue colour shade and shows no material-related stripiness at all is obtained.

Dyeing Example 14

10 parts of polyamide 6.6 yarn are dyed in 400 parts of an aqueous liquor which comprises 1.5 g/l of ammonium acetate and 0.5%, based on the fibre weight, of the dye of the formula (118) according to Example 4 and is brought to pH 5.5 with acetic acid. The dyebath is heated to 98° C. in the course of 30 minutes and kept at 96° C. to 98° C. for 60 minutes. The dyed yarn is then removed and rinsed and dried in the customary manner. A yarn dyed in a blue colour shade is obtained.

What is claimed is:

1. A dye mixture wherein the dyes consist essentially of 5 to 95% by weight of the 1:2 cobalt complex dye of the formazan compound of the formula

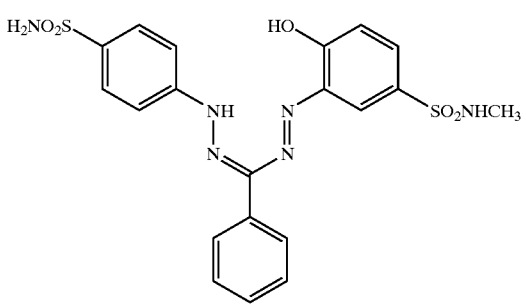

(8a)

together with at least one anthraquinone dye of the formulae (2) and (11)

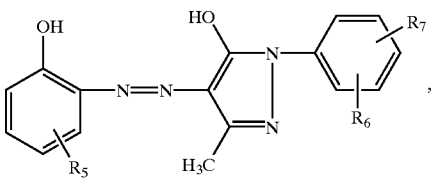

(2)

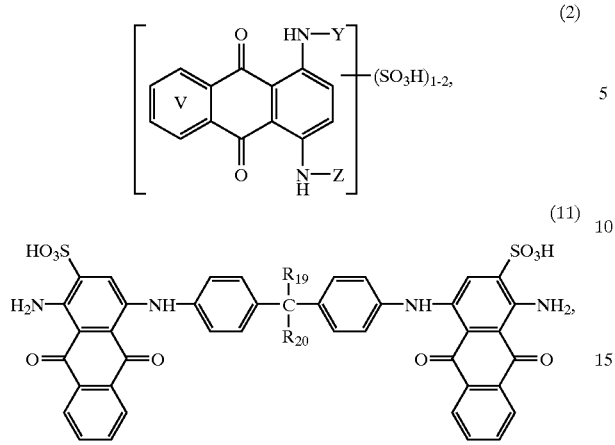

(11)

in which

Z is phenyl which is unsubstituted or substituted by $C_1$–$C_{12}$alkyl, $C_1$–$C_4$alkoxy, $C_2$–$C_4$alkanoylamino, hydroxyl, nitro, carboxyl, cyano, amino, halogen, benzoylaminomethyl, chloroacetylamino, chloroacetylaminomethyl, α-chloroacryloylaminomethyl, acryloylaminomethyl, or by phenoxy, phenylcarbonylamino, phenylsulfonyloxy, phenylsulfonylamino, phenylsulfonylaminomethyl or N-methylphenylsulfonylaminomethyl, where the phenyl radicals contain no further substituents or are further substituted by $C_1$–$C_{12}$alkyl, $C_1$–$C_4$alkoxy, $C_2$–$C_4$alkanoylamino, hydroxyl, nitro, carboxyl, cyano, amino, halogen, benzoylaminomethyl, chloroacetylamino, chloroacetylaminomethyl, α-chloroacryloylaminomethyl or acryloylaminomethyl, or Z is $C_1$–$C_8$alkyl which is unsubstituted or is substituted by phenyl, where the phenyl radical contains no further substituents or is further substituted as defined for a phenyl radical Z above, or Z is cyclohexyl which is unsubstituted or is substituted by $C_1$–$C_{12}$alkyl or phenylsulfonylamino or benzyl, where the phenyl radicals contain no further substituents or are further substituted by $C_1$–$C_{12}$alkyl, $C_1$–$C_4$alkoxy, $C_2$–$C_4$alkanoylamino or halogen, or Z is 1,2,3,4-tetrahydronaphthyl, Y is hydrogen or is as defined for Z above, and in which anthraquinone dye of the formula (2) the ring V contains no further substituents or is further substituted by one or two hydroxyl groups, and $R_{19}$ and $R_{20}$ are hydrogen or methyl, or together with at least one 1:2 chromium or 1:2 cobalt complex dye of two identical or different azo compounds selected from the group consisting of compounds of the formulae (3), (4), (5) and (6)

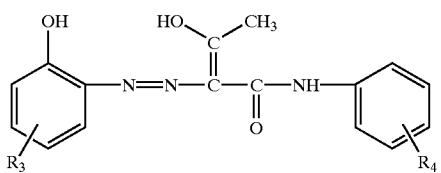

(3)

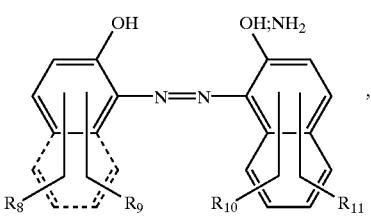

(4)

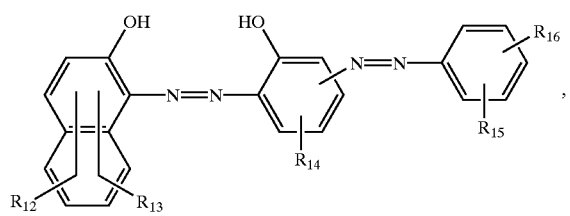

(5)

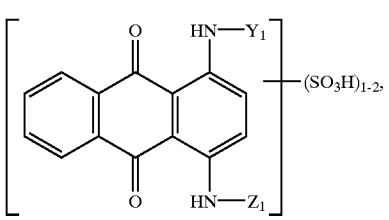

(6)

in which $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ independently of one another are hydrogen, $C_1$–$C_{12}$alkyl, $C_1$–$C_4$alkoxy, $C_2$–$C_4$alkanoylamino, halogen, sulfo, hydroxyl, nitro, sulfamoyl or N—$C_1$–$C_{12}$alkylsulfamoyl, which is unsubstituted or further substituted in the alkyl moiety by hydroxyl or $C_1$–$C_{12}$alkoxy.

2. A dye mixture according to claim 1, which comprises, as the anthraquinone dye of the formula (2), an anthraquinone dye of the formula (9)

in which $Z_1$ is phenyl which is unsubstituted or substituted by $C_1$–$C_{12}$alkyl, $C_1$–$C_4$alkoxy, $C_2$–$C_4$alkanoylamino, halogen, benzoylaminomethyl, chloroacetylamino, chloroacetylaminomethyl or α-chloroacryloylaminomethyl; phenyl-$C_1$–$C_8$alkyl, where the phenyl radical contains no further substituents or is substituted as defined for a phenyl radical $Z_1$ above; cyclohexyl which is unsubstituted or substituted by $C_1$–$C_4$alkyl, phenylsulfonylamino or $C_1$–$C_4$alkylphenylsulfonylamino; 1,2,3,4-tetrahydronaphthyl; or a radical of the formula

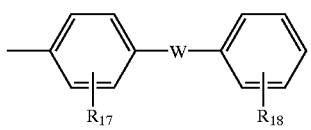

in which
- W is a bridge member of the formula —O—, —NH—CO—, —OSO$_2$—, —NH—SO$_2$—, —CH$_2$—NH—SO$_2$— or —CH$_2$—N(CH$_3$)—SO$_2$—,
- R$_{17}$ is hydrogen, C$_1$–C$_4$alkyl, C$_1$–C$_4$alkoxy or halogen and
- R$_{18}$ is hydrogen, C$_1$–C$_4$alkyl, C$_1$–C$_4$alkoxy, halogen or acryloylaminomethyl,
- Y$_1$ is hydrogen; C$_1$–C$_4$alkyl; phenyl which is unsubstituted or substituted by C$_1$–C$_4$alkyl, C$_1$–C$_4$alkoxy or halogen; phenyl-C$_1$–C$_8$alkyl which is unsubstituted or substituted in the phenyl ring by C$_1$–C$_4$alkyl, C$_1$–C$_4$alkoxy, halogen or benzoylaminomethyl; cyclohexyl which is unsubstituted or substituted by C$_1$–C$_4$alkyl; or 1,2,3,4-tetrahydronaphthyl, or an anthraquinone dye of the formula

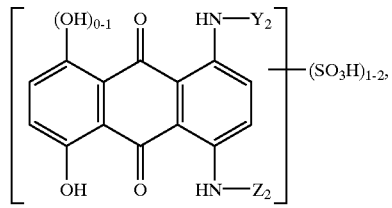

(10)

in which Z$_2$ is phenyl which is unsubstituted or substituted by C$_1$–C$_4$alkyl, C$_1$–C$_4$alkoxy or halogen or cyclohexyl which is unsubstituted or substituted by C$_1$–C$_4$alkyl or benzyl and Y$_2$ is C$_1$–C$_4$alkyl or is as defined above for Z$_2$.

3. A dye mixture according to claim 1, which comprises, as the anthraquinone dye of the formula (2) or (11), an anthraquinone dye of the formula (12)

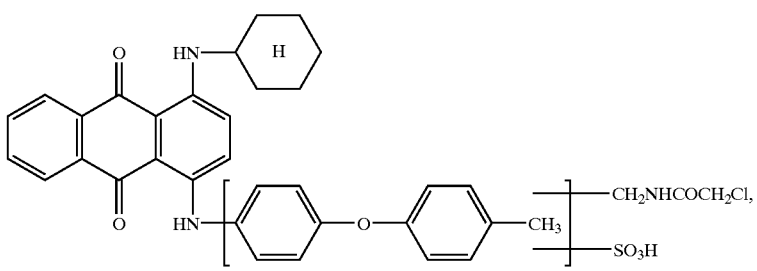

(13)

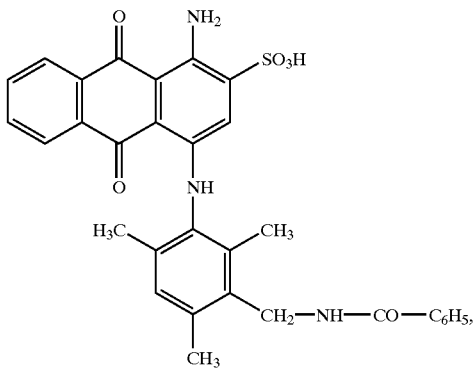

(14)

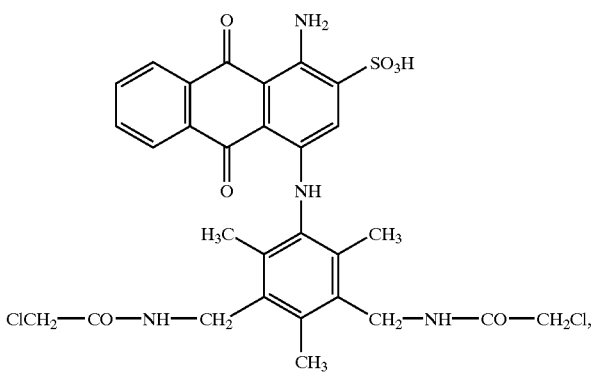

-continued
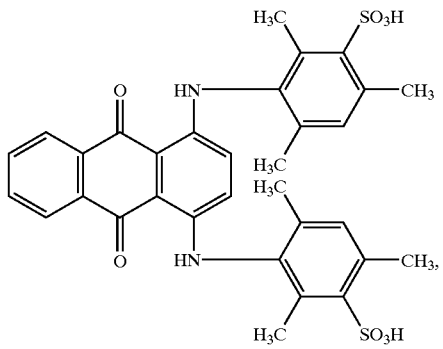
(15)
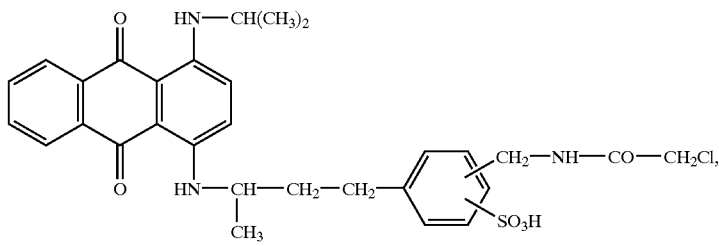
(16)
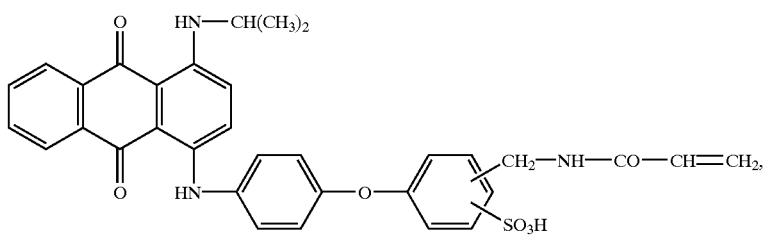
(17)
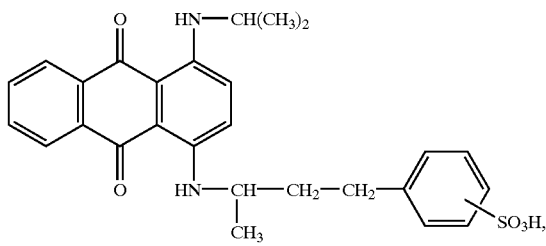
(18)
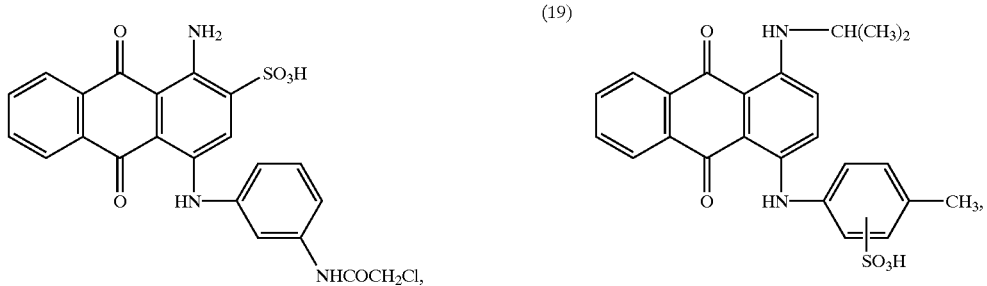
(19) (20)
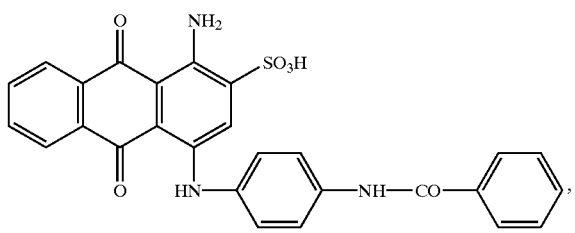
(21)

(22)
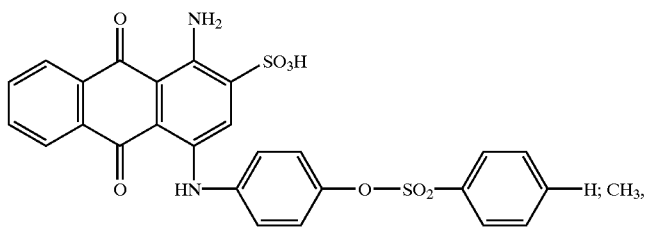
(23)
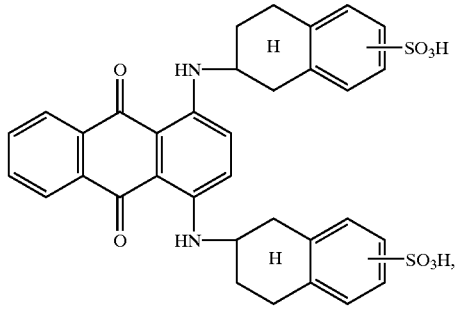
(24)
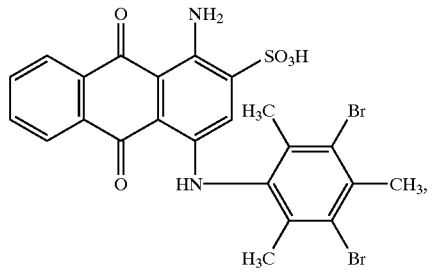
(25)
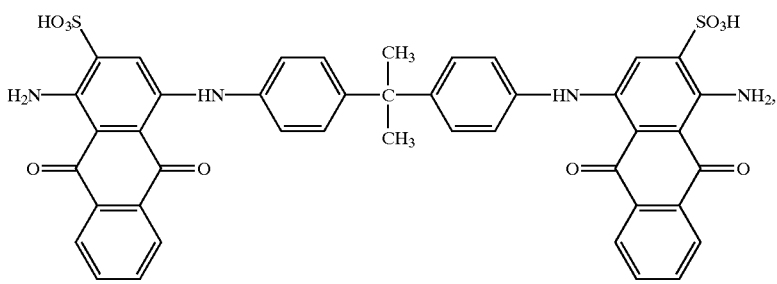
(26)
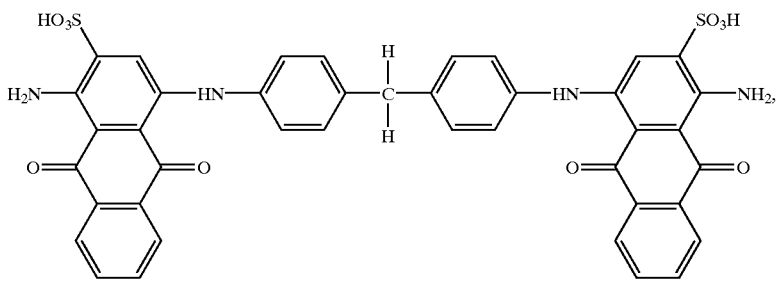
(27)
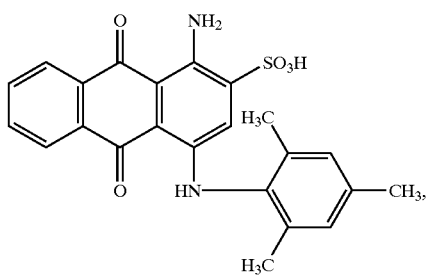
(28)
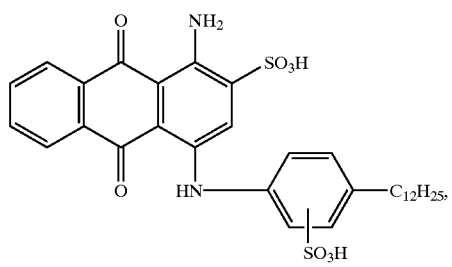

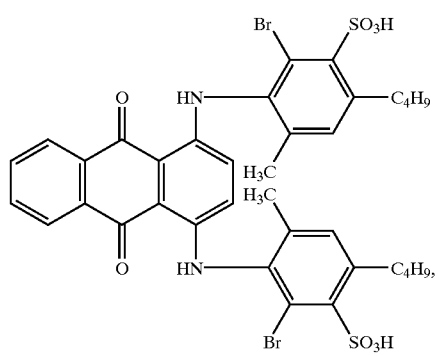 (29)
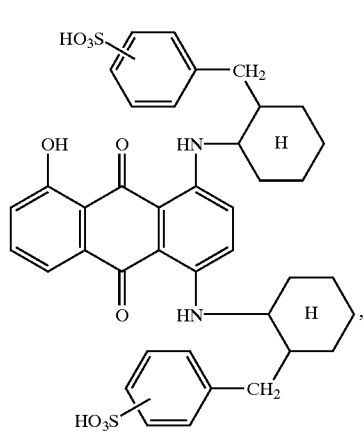 (30)
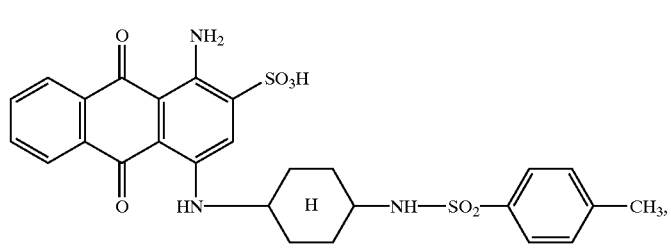 (31)
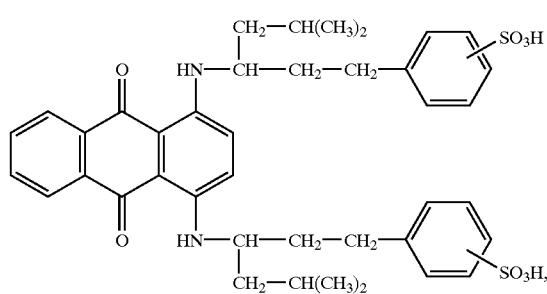 (32)

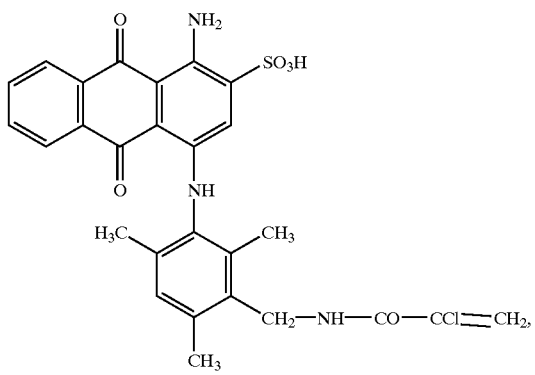
(33)
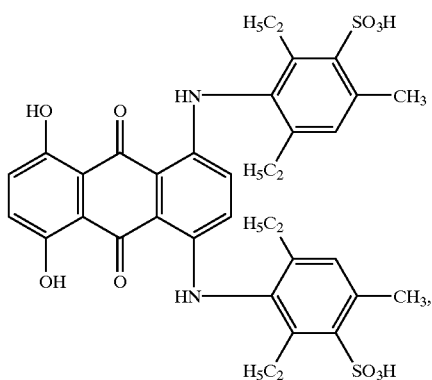
(34)
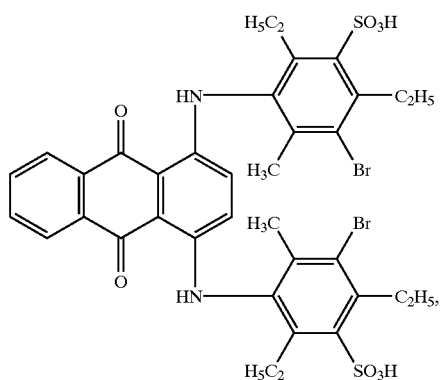
(35)
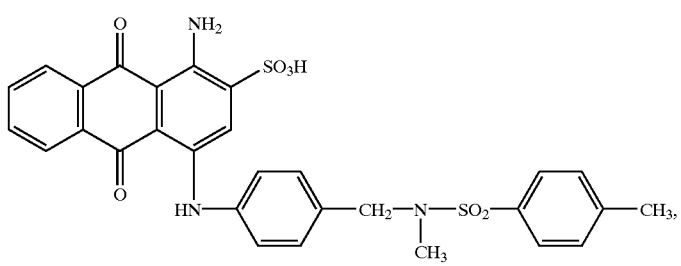
(36)
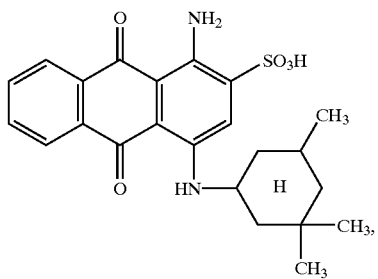
(37)
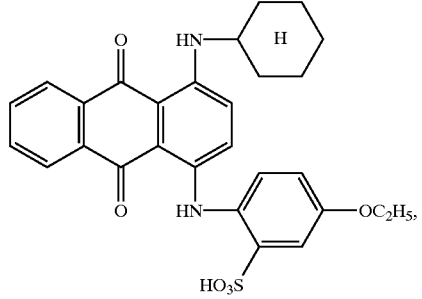
(38)
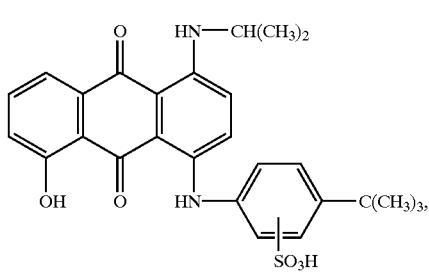
(39)

-continued
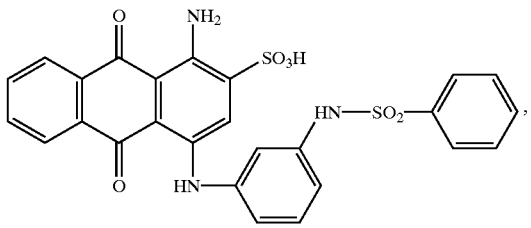
(40)
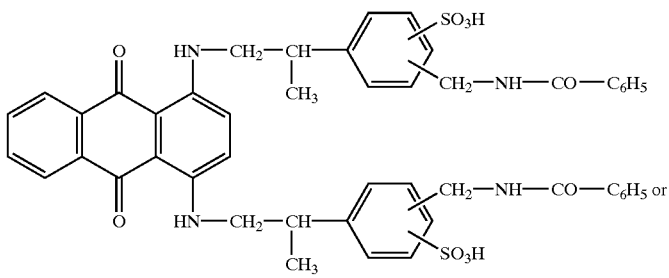
(41)
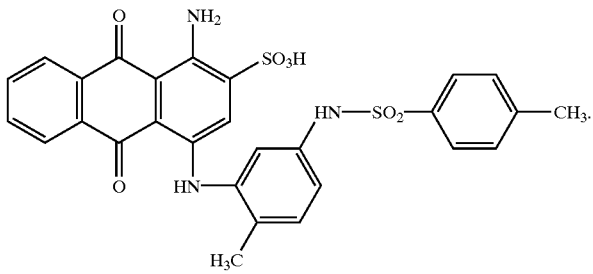
(42)
4. A dye mixture according to claim 1, which comprises, as the 1:2 chromium or 1:2 cobalt complex azo dye, a dye of the formula
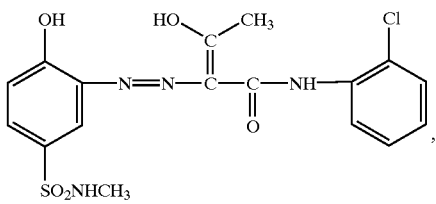
(43)
1:2 cobalt complex
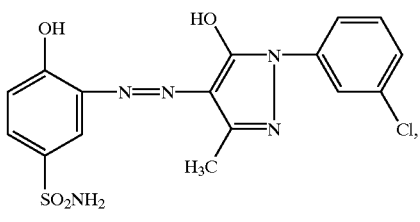
(44)
1:2 cobalt complex
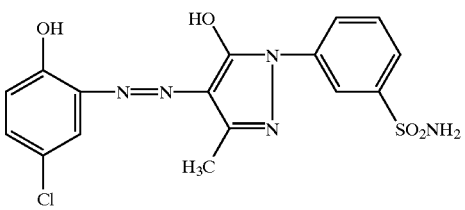
(45)
1:2 cobalt complex
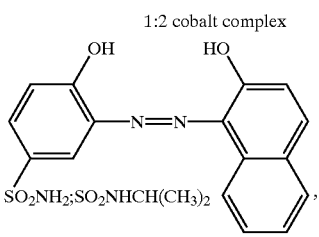
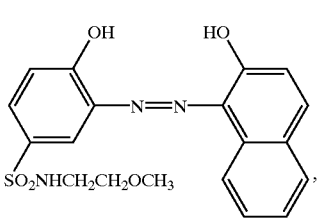
(46)
1:2 cobalt complex -continued
(47)
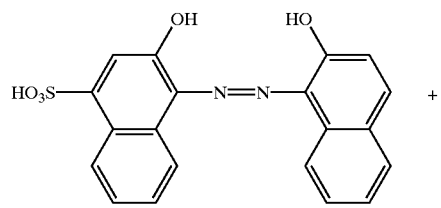
1:2 chromium complex
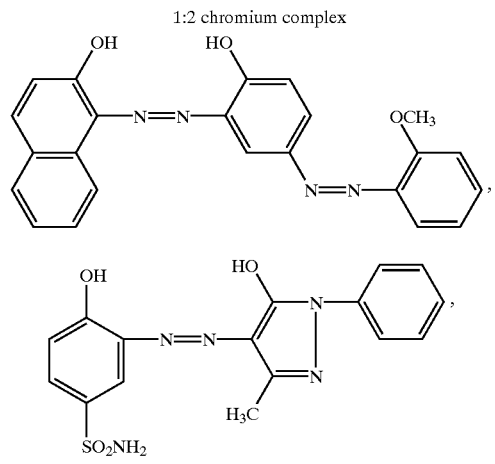
1:2 cobalt complex
-continued
(49)
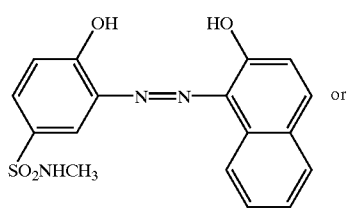
1:2 cobalt complex
(50)
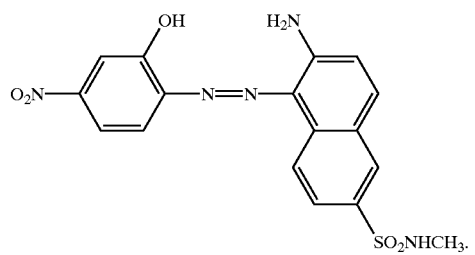
1:2 cobalt complex
* * * * *